United States Patent
Little et al.

(10) Patent No.: US 9,891,386 B2
(45) Date of Patent: Feb. 13, 2018

(54) HYBRID CONNECTOR FOR BOTH ELECTRICAL AND OPTICAL TRANSMISSION

(71) Applicant: FOXCONN INTERCONNECT TECHNOLOGY LIMITED, Grand Cayman (KY)

(72) Inventors: Terrance F. Little, Fullerton, CA (US); Yuan Zhang, Rowland-Heights-CA, CA (US); An-Jen Yang, Irvine, CA (US); Paul Chen, Walnut, CA (US)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days.

(21) Appl. No.: 15/095,172

(22) Filed: Apr. 11, 2016

(65) Prior Publication Data

US 2016/0282564 A1    Sep. 29, 2016

Related U.S. Application Data

(63) Continuation-in-part of application No. 15/080,613, filed on Mar. 25, 2016, now Pat. No. 9,720,181, which is a continuation-in-part of application No. 15/083,315, filed on Mar. 29, 2016.

(60) Provisional application No. 62/146,228, filed on Apr. 10, 2015, provisional application No. 62/193,492, filed on Jul. 16, 2015, provisional application No. (Continued)

(51) Int. Cl.
*G02B 6/36* (2006.01)
*G02B 6/38* (2006.01)
*H01R 24/64* (2011.01)
*H01R 13/627* (2006.01)

(52) U.S. Cl.
CPC ......... *G02B 6/3817* (2013.01); *G02B 6/3849* (2013.01); *G02B 6/3853* (2013.01); *G02B 6/3882* (2013.01); *G02B 6/3885* (2013.01); *G02B 6/3893* (2013.01); *H01R 13/6272* (2013.01); *H01R 24/64* (2013.01)

(58) Field of Classification Search
None
See application file for complete search history.

(56) References Cited

U.S. PATENT DOCUMENTS

| 5,896,480 A | 4/1999 | Scharf et al. |
| 7,326,087 B2 | 2/2008 | Gerlach et al. |
| 8,708,754 B2 | 4/2014 | Hon Hai |

(Continued)

*Primary Examiner* — Mike Stahl
(74) *Attorney, Agent, or Firm* — Wei Te Chung; Ming Chieh Chang

(57) ABSTRACT

A hybrid plug connector including an insulative housing defining a cavity to receive an optical fiber assembly therein, and a plurality of passageways to receive a plurality of terminals therein. A printed circuit board is located behind the terminals and connected to the terminals. An electrical cable is mounted to a rear portion of the circuit board. The whole optical fiber assembly is received within the housing and is somewhat back and forth moveable along a front-to-back direction for buffering for compliantly coupling with another optical fiber assembly built within the complementary receptacle connector when the plug connector is inserted into the complementary receptacle connector. A lens module is formed on the optical fiber assembly for collimating the light beams from the optical fibers.

15 Claims, 30 Drawing Sheets

Related U.S. Application Data

62/137,829, filed on Mar. 25, 2015, provisional application No. 62/141,259, filed on Mar. 31, 2015.

(56) References Cited

U.S. PATENT DOCUMENTS

| | | |
|---|---|---|
| 2011/0243505 A1 | 10/2011 | Avago |
| 2011/0262082 A1* | 10/2011 | Sakurai ................ G02B 6/3817 385/89 |
| 2012/0189252 A1* | 7/2012 | Bhagavatula ............ G02B 6/32 385/79 |
| 2012/0314999 A1 | 12/2012 | Hon Hai |

* cited by examiner

HYBRID CONNECTOR FOR BOTH ELECTRICAL AND OPTICAL TRANSMISSION

CROSS REFERENCE TO RELATED APPLICATIONS

This application claims the benefit of, and priority to U.S. Provisional Patent Application No. 62/146,228 filed Apr. 10, 2015 and No. 62/193,492, filed Jul. 16, 2015, the contents of which are incorporated entirely herein by reference.

BACKGROUND OF THE INVENTION

1. Field of the Invention

The present invention relates to a hybrid connector, and more particularly to a connector with the RJ45 configuration while further equipped with optical fiber device therewith so as to transmit both electrical and optical signals therein.

2. Description of Related Art

U.S. Pat. No. 8,708,754 discloses a hybrid connector with the regular RJ45 configuration to transmit both electrical and optical signals. Anyhow, only two optic fibers are available in such a design and no resilient force is provided for assuring coupling between the coupled optical fibers of the mated plug connector and the RJ connector. The optic fibers need a strict accurate/intimate alignment between the coupled fibers of a complementary receptacle connector.

SUMMARY OF THE INVENTION

Accordingly, the object of the present invention is to provide a hybrid plug connector including an insulative housing defining a cavity to receive an optical fiber assembly therein, and a plurality of passageways to receive a plurality of terminals therein. A printed circuit board is located behind the terminals and connected to the terminals. An electrical cable is mounted to a rear portion of the circuit board. The optical fiber assembly includes a base block with therein a plurality of through holes and a plurality of upward grooves in alignment with the corresponding through holes in the front-to-back direction, respective. A lens module for collimating light beams is located around a front surface of the base block. A cap is pivotally mounted to the base block with a pair of resilient latches on two lateral sides and with a plurality of downward grooves aligned with the corresponding upward grooves in a vertical direction, respectively. A plurality of optical fibers are retained within the base block and the cap and intimately forwardly confront the lens module. The whole optical fiber assembly is received within the housing and is somewhat back and forth moveable along a front-to-back direction for buffering for compliantly coupling with another optical fiber assembly built within the complementary receptacle connector when the plug connector is inserted into the complementary receptacle connector. Notably, the lens module functions as a beam expander so as to avoid the strict accurate/intimate alignment between the coupled fibers of the complementary receptacle connector.

Another object of the invention is to provide the optical fiber assembly includes a base block and at least one cap pivotally mounted thereon, a pair of through holes formed in the base block, a pair of mating sleeves disposed in the corresponding through holes, and each mating sleeve receive a front GRIN lens and a rear guide-in cylinder. Notably, the GRIN lens functions as a beam expander so as to avoid the strict accurate/intimate alignment between the coupled fibers of the complementary receptacle connector.

Other objects, advantages and novel features of the invention will become more apparent from the following detailed description when taken in conjunction with the accompanying drawings.

DETAILED DESCRIPTION OF THE PREFERRED EMBODIMENT

Figure 1:
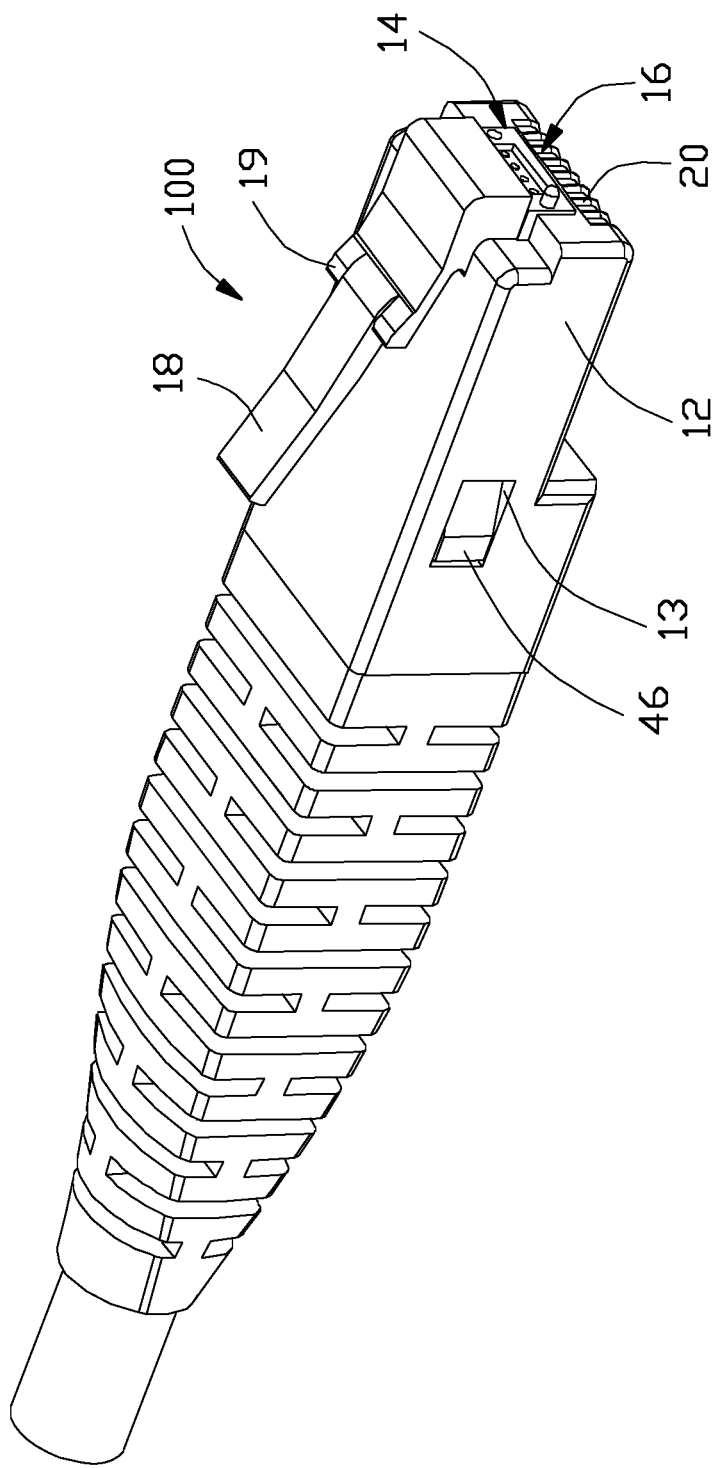
FIG. 1 is a front perspective view of the plug connector according to a first embodiment of the invention.
Figure 2:
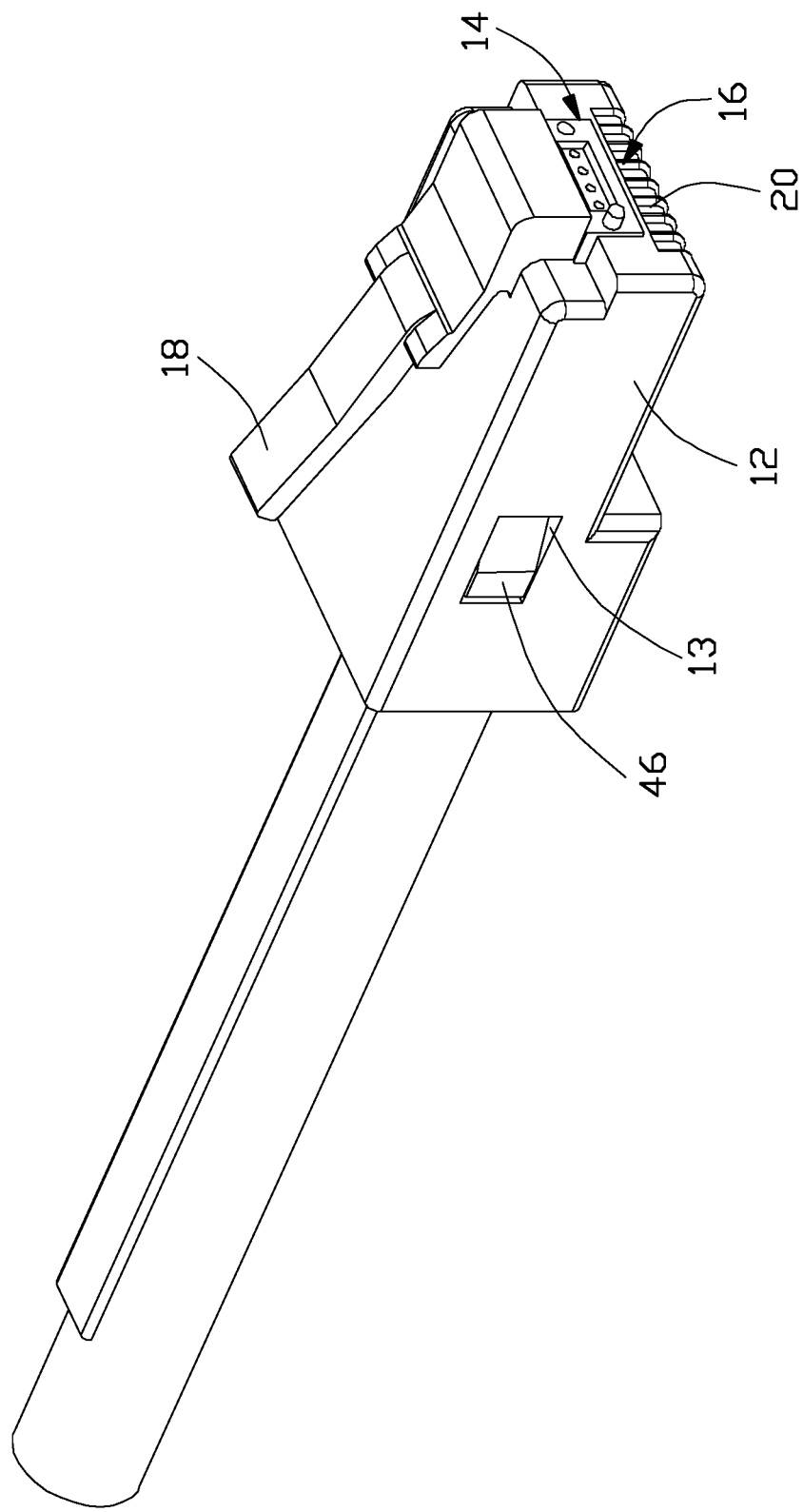
FIG. 2 is a front perspective view of the plug connector of FIG. 1 with strain relief removed therefrom.
Figure 3A:
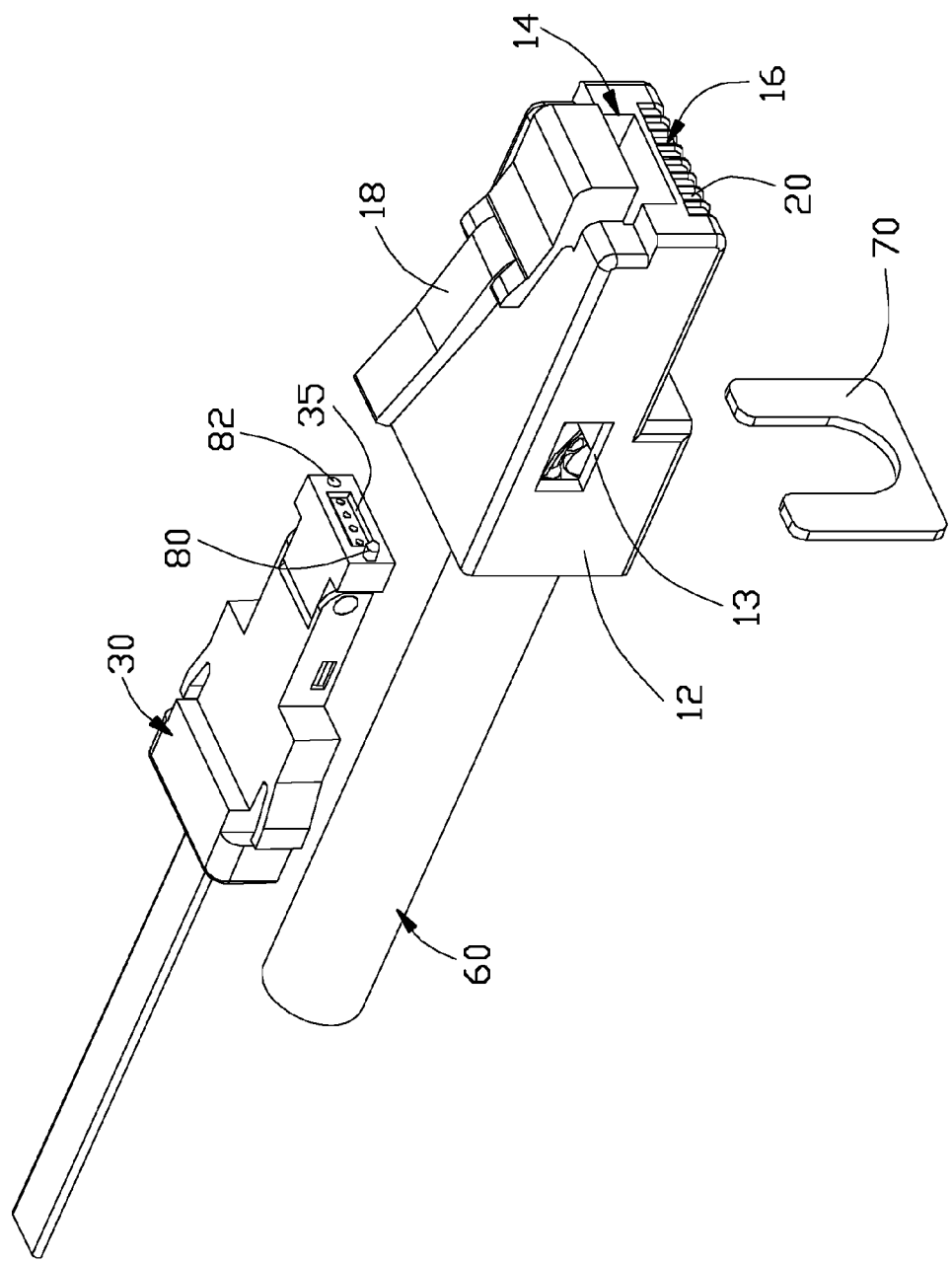
FIG. 3(A) is a front exploded perspective view of the plug connector of FIG. 2 with the electrical contact assembly assembled therein and the optical fiber assembly therefrom.
Figure 3B:
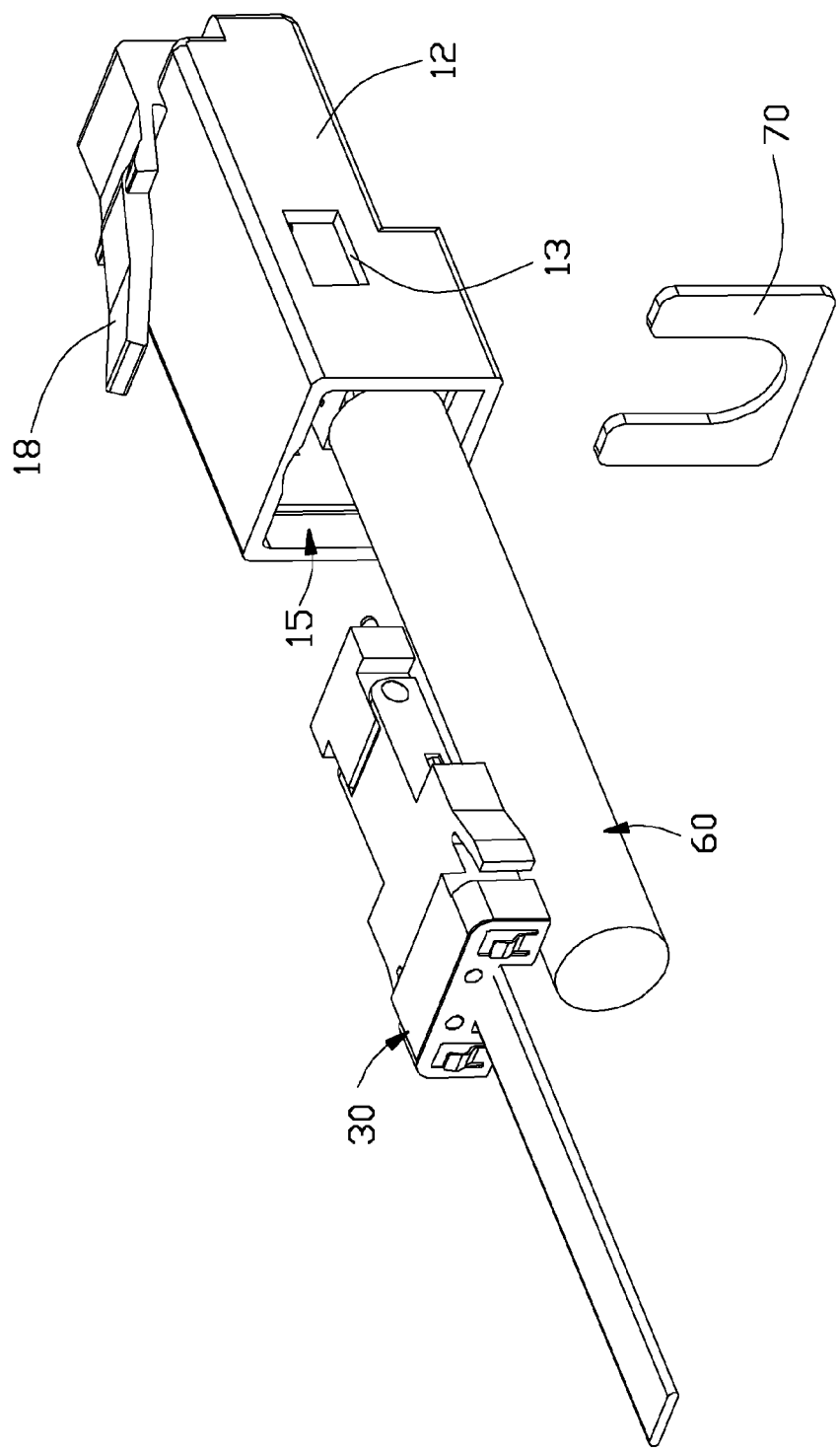
FIG. 3(B) is a rear exploded perspective view of the plug connector of FIG. 3(A).
Figure 4A:
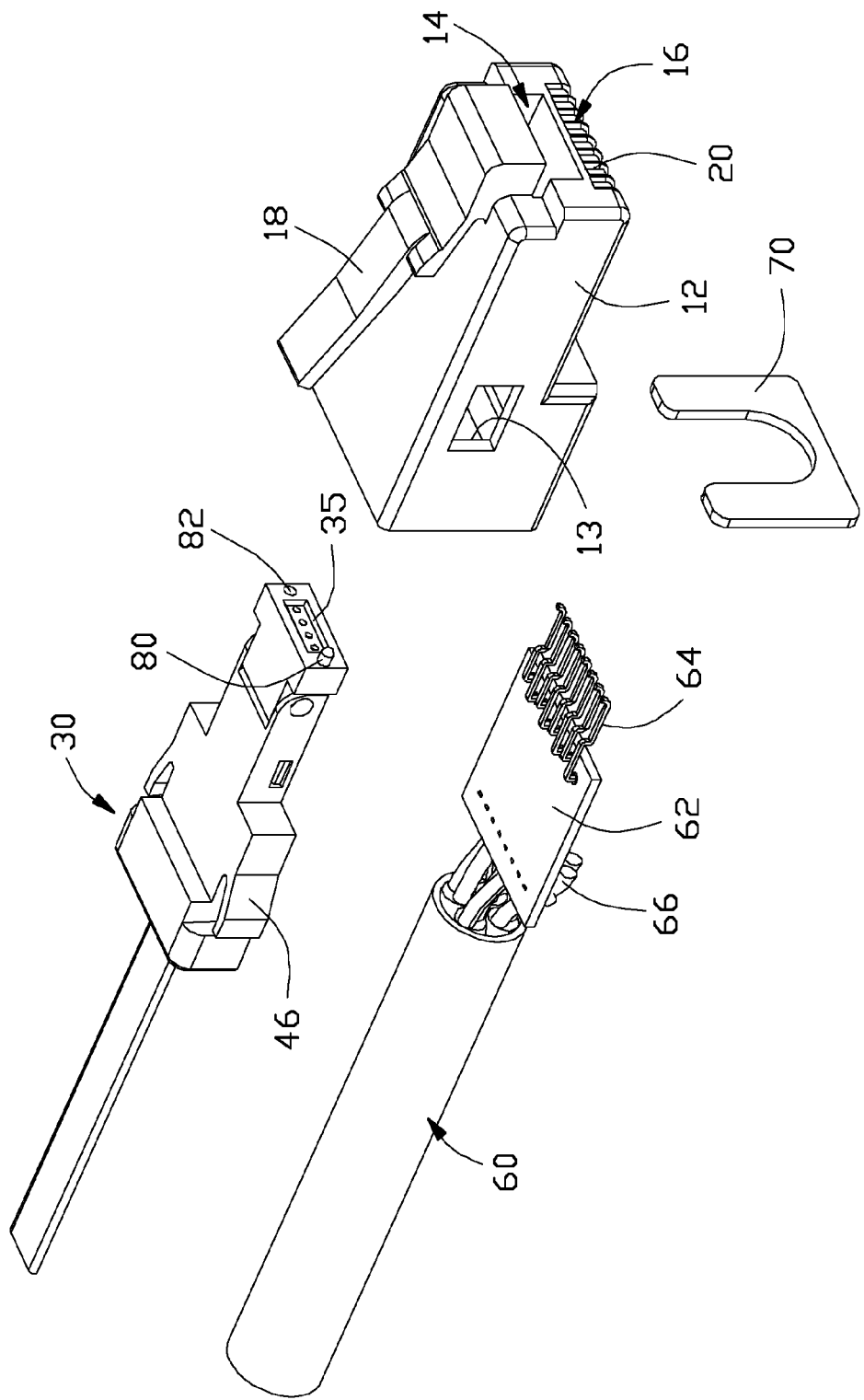
FIG. 4(A) is a front exploded perspective view of the plug connector of FIG. 3(A) with the electrical contact assembly.
Figure 4B:
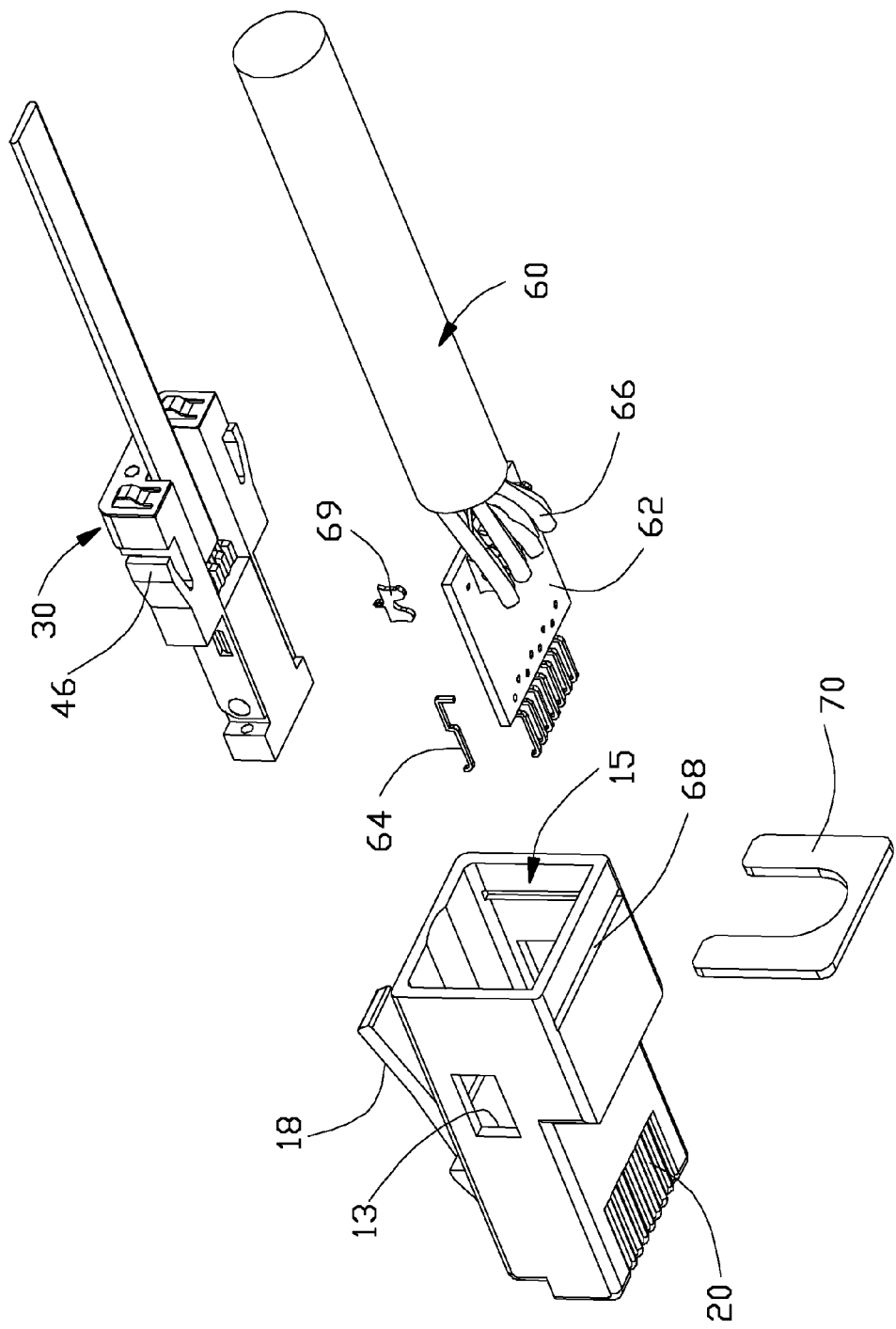
FIG. 4(B) is a rear exploded perspective view of the plug connector of FIG. 4(A).
Figure 5:
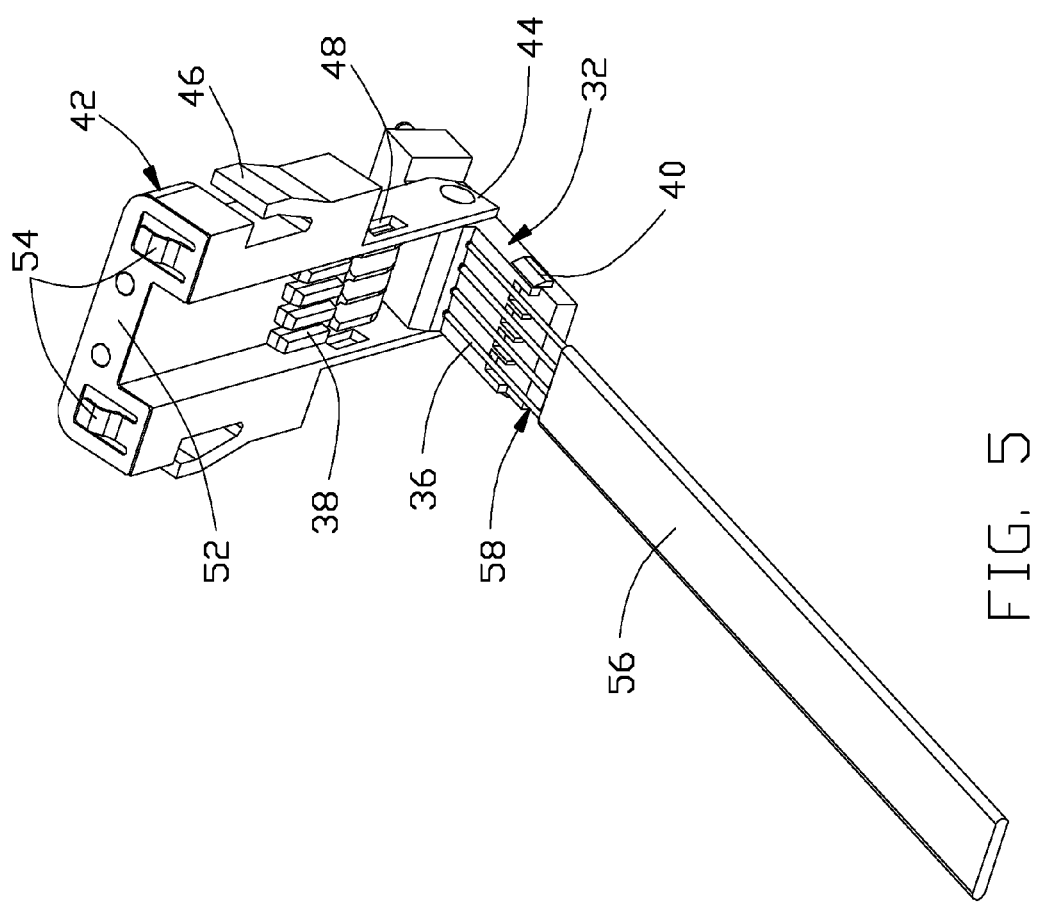
FIG. 5 is a rear perspective view of the optical fiber assembly of the plug connector of FIG. 1 with the cap is rotated to an open position.
Figure 6:
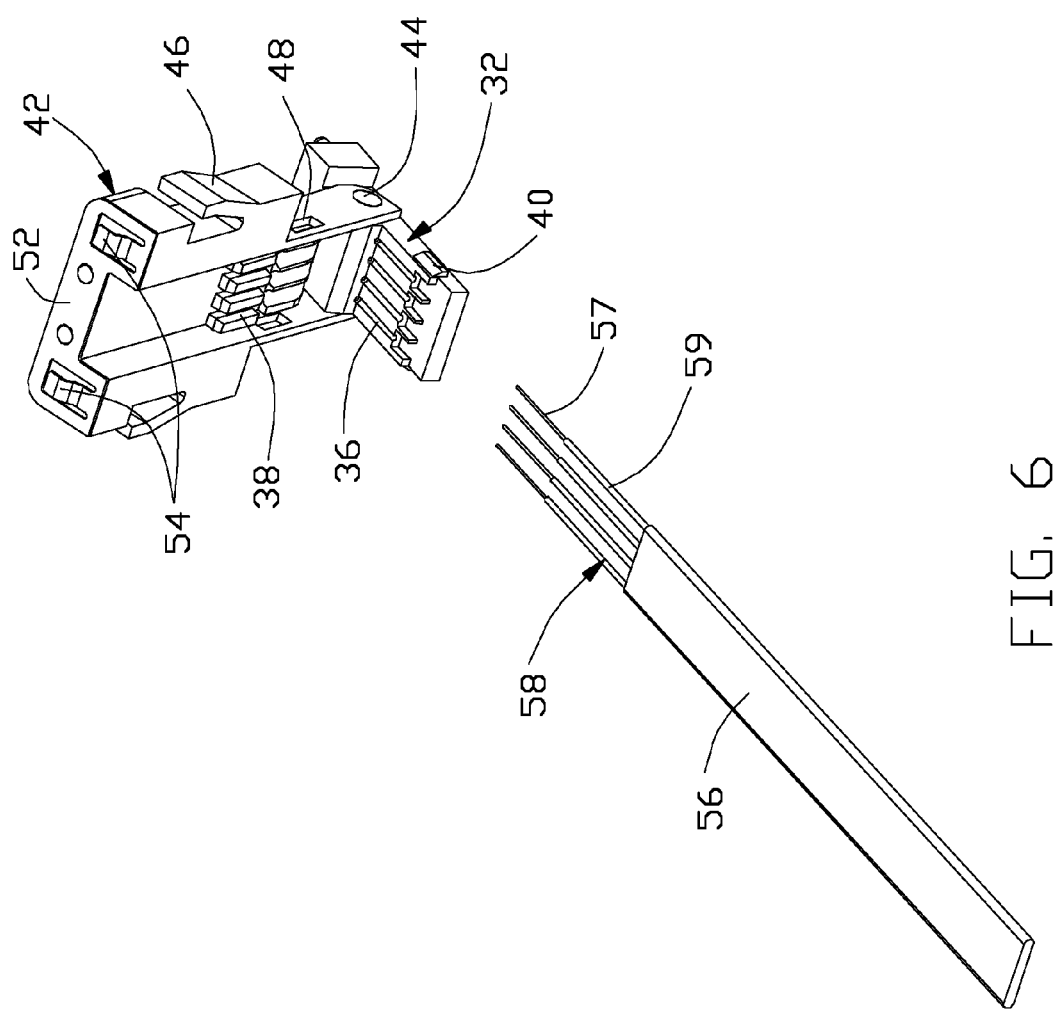
FIG. 6 is a rear exploded perspective view of the optical fiber assembly of FIG. 5.
Figure 7A:
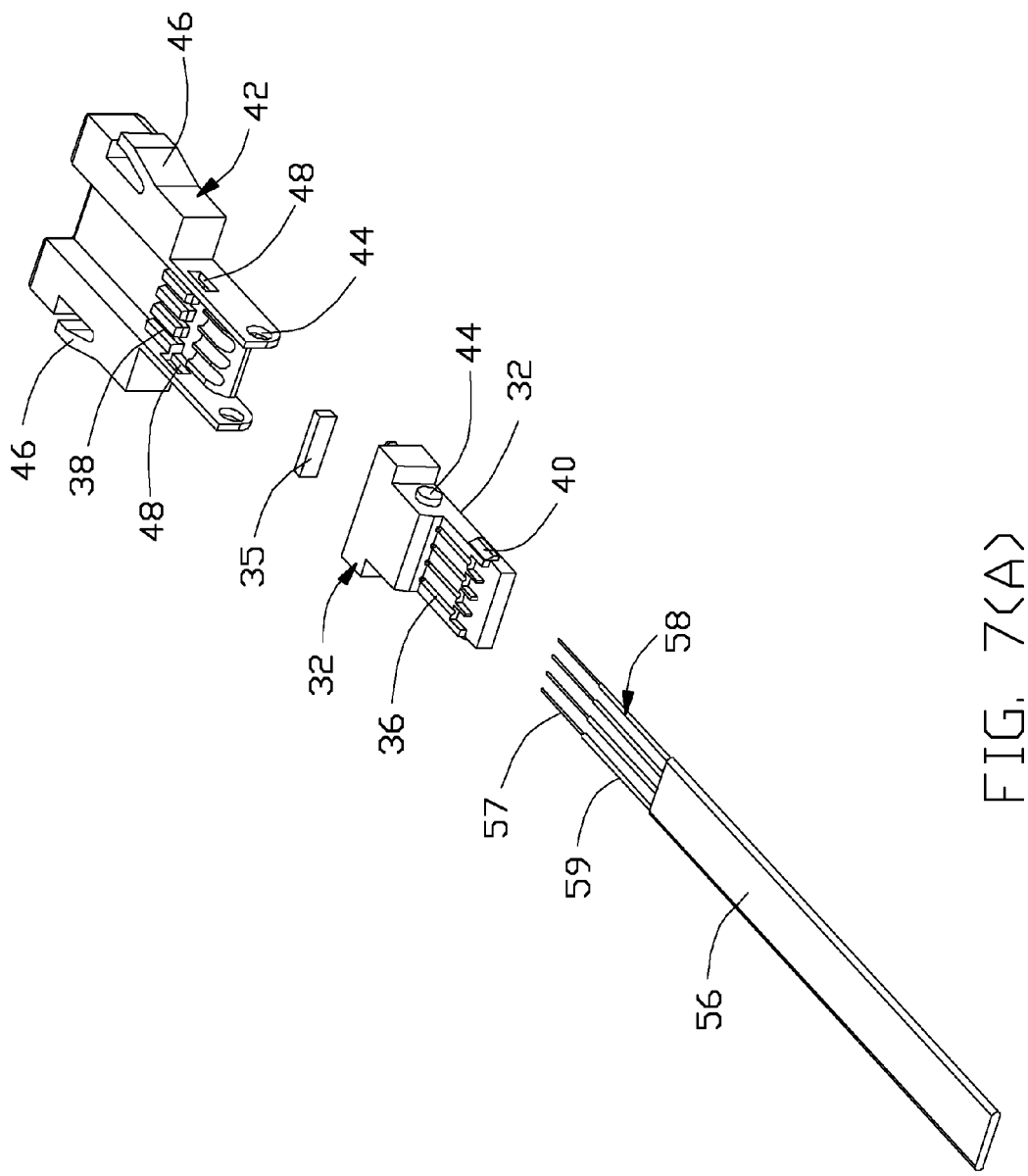
FIG. 7(A) is a rear exploded perspective view of the optical fiber assembly of FIG. 6 with the cap is pivotally moved away from the base block.
Figure 7B:
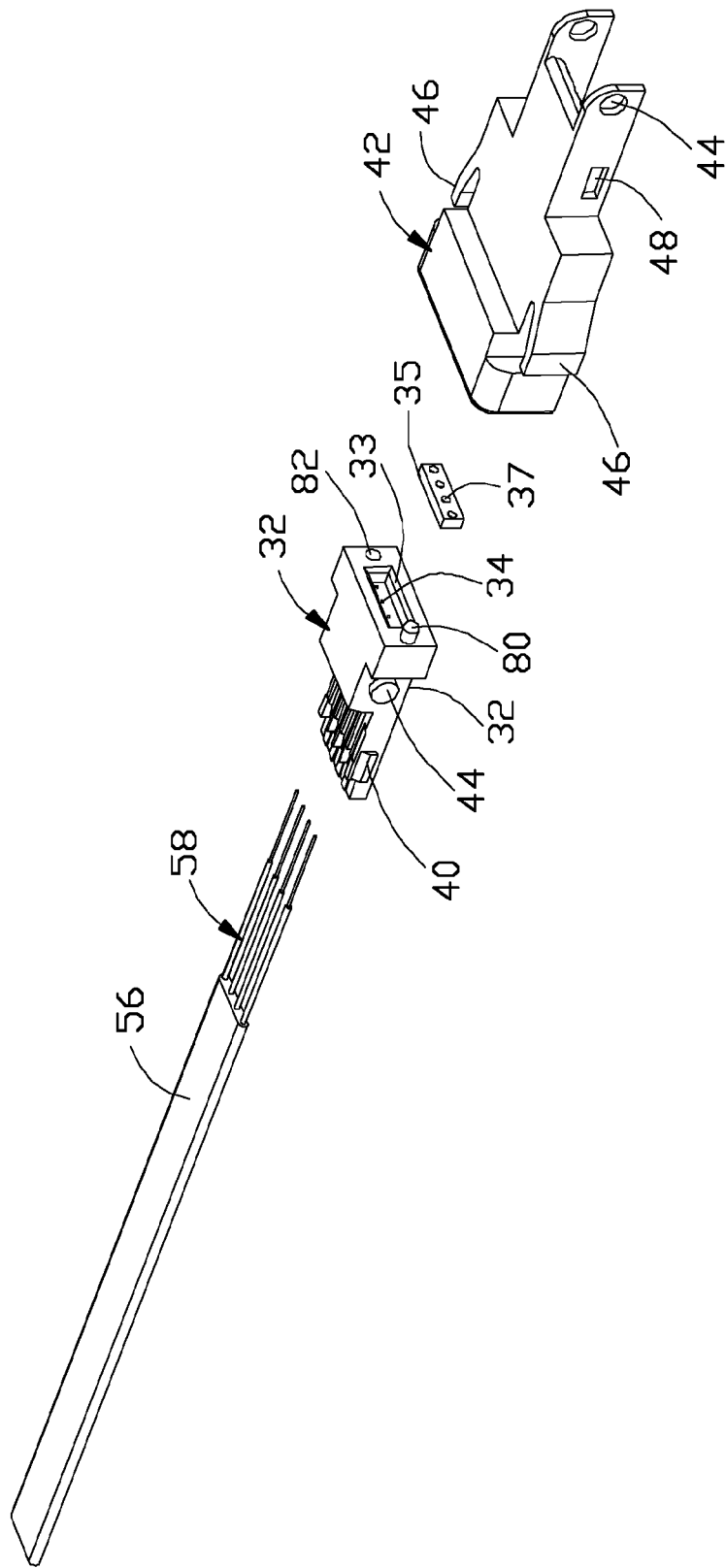
FIG. 7(B) is a front exploded perspective view of the optical fiber assembly of FIG. 7(A).
Figure 8:
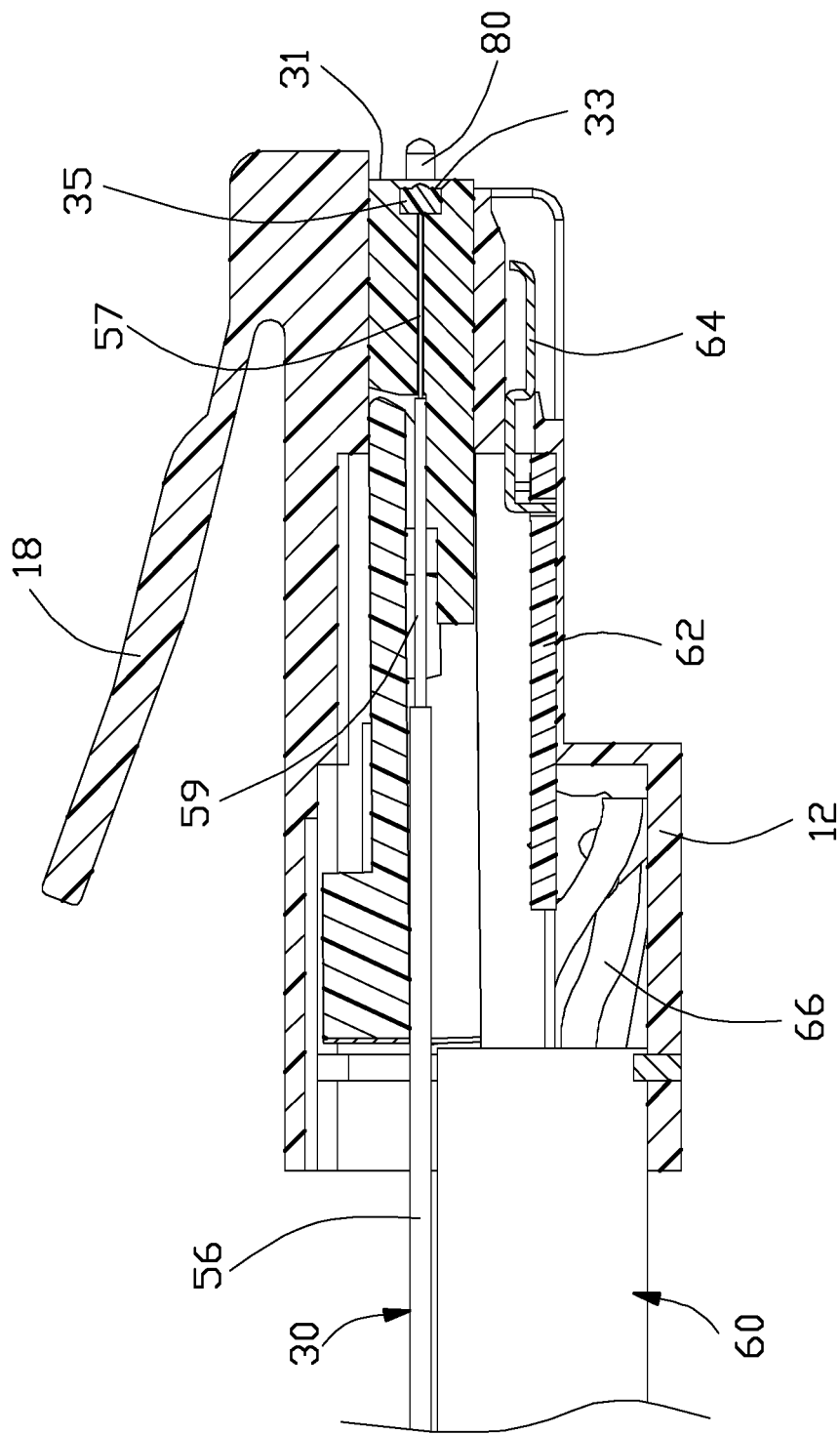
FIG. 8 is a vertical cross-sectional view of the optical fiber assembly of FIG. 1.
Figure 9:
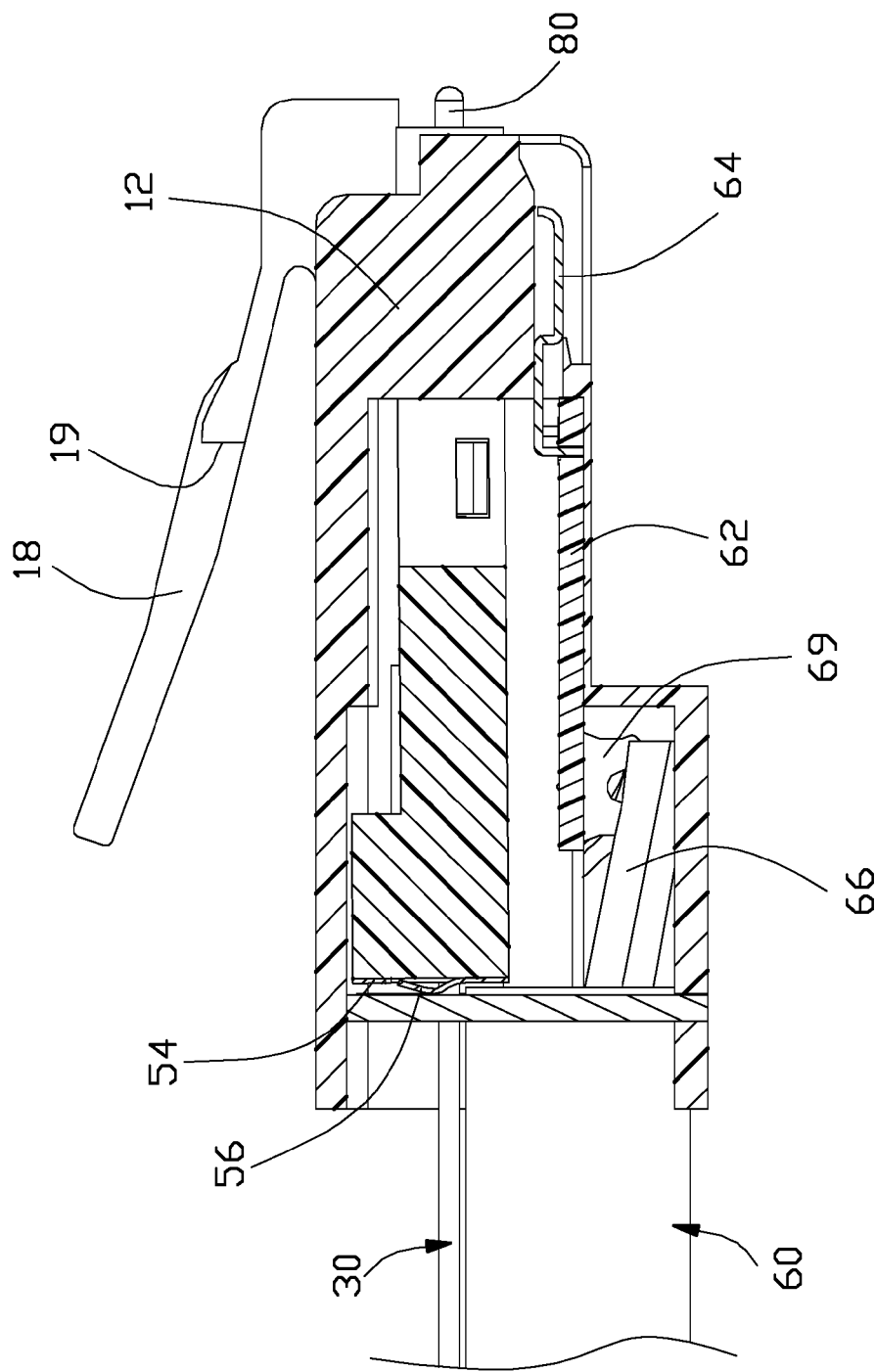
FIG. 9 is another vertical cross-sectional view of the plug connector of FIG. 1.
Figure 10:
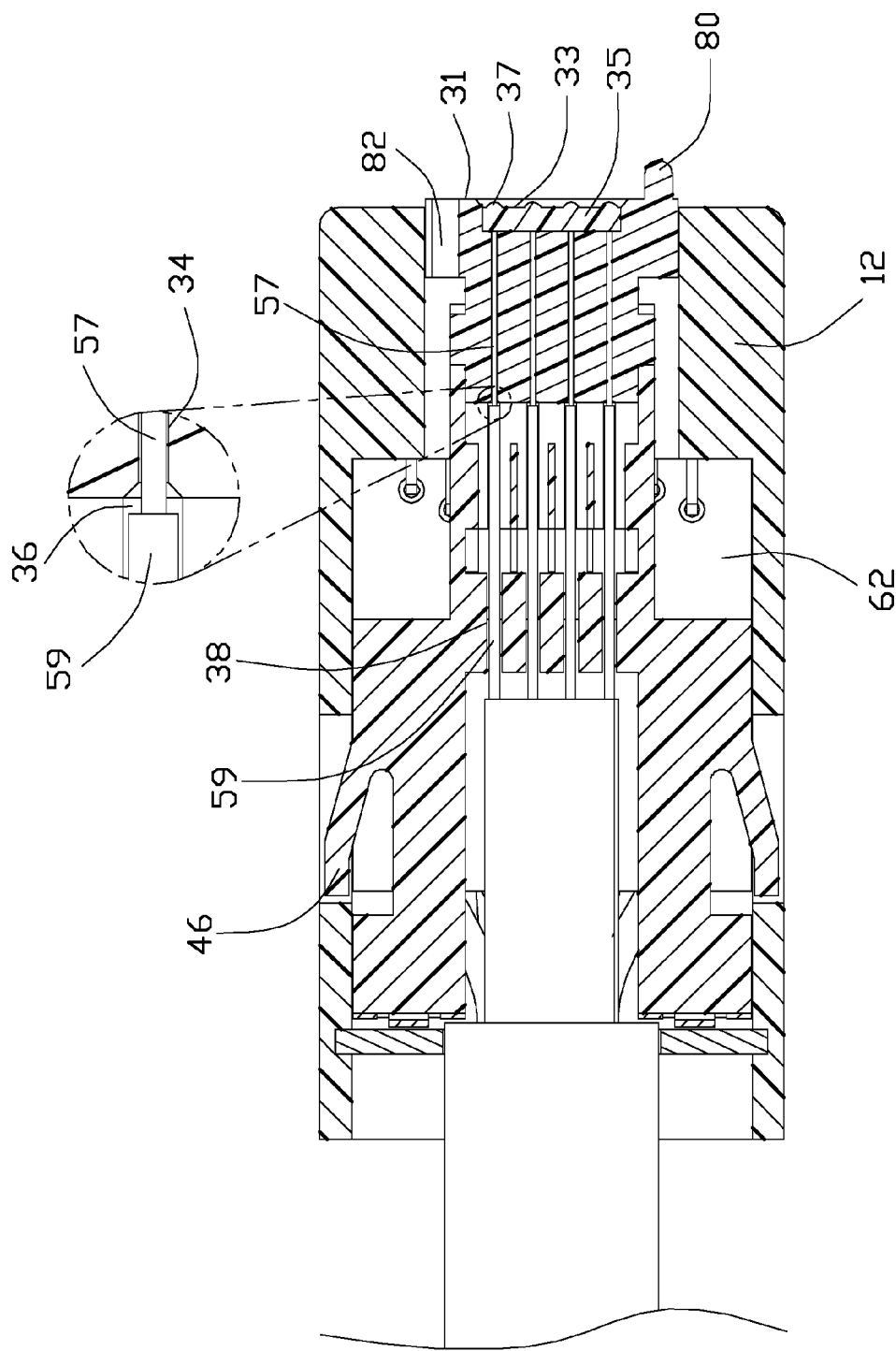
FIG. 10 is a horizontal cross-sectional view of the plug connector of FIG. 1.
Figure 11:
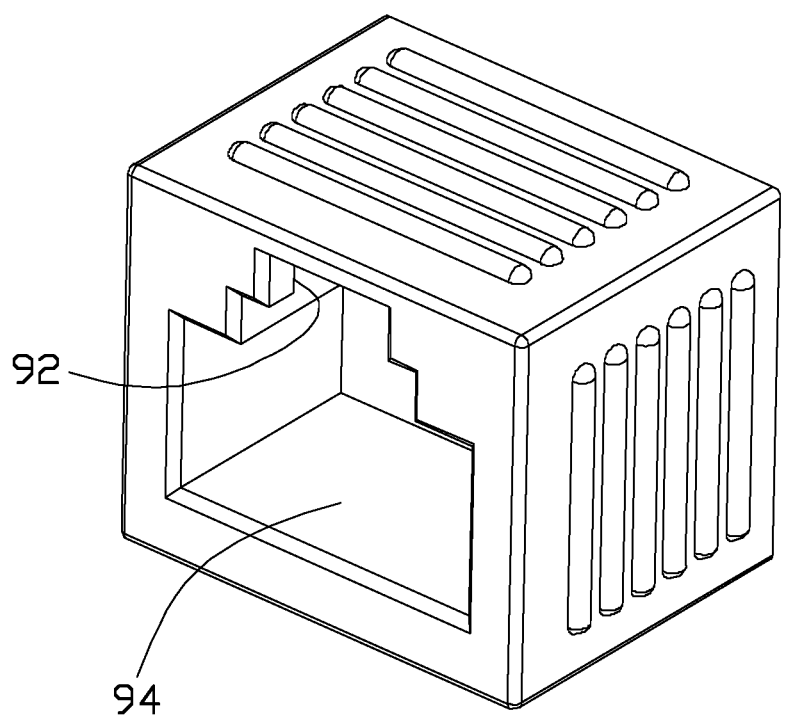
FIG. 11 is a perspective view of an anti-dust cover for use with the plug connector of FIG. 1.

Reference will now be made in detail to the preferred embodiment of the present invention.

FIGS. 1-11 show a plug connector 10 of the first embodiment for mating with a receptacle connector. The plug connector 10 includes an insulative housing 12 forming an optical mating port 14 and an electrical mating port 16 stacked with each other in a vertical direction. A receiving cavity 15 is formed in the housing 12 and communicates with the optical mating port 14 and the electrical mating port 16. A resilient latch 18 is unitarily formed on the housing 12 beside the optical mating port 14 and opposite to the electrical mating port 16 in the vertical direction. A plurality of passageways 20 extending along a front-to-back direction, are formed in the housing 12 around the electrical mating port 16. The contour of the housing 12 is compliant with the RJ-45 receptacle connector.

An optical fiber assembly 30 includes a base block 32 forming a plurality of through hole 34 extending along the front-to-back direction therein and a plurality of grooves 36 dimensioned diametrically larger than the through holes 34 and located behind and communicatively aligned with the corresponding through holes 34. A pair of locking pegs 40 are formed on two opposite lateral sides of the base block 32. A cap 42 is pivotally mounted to the base block 32 and rotatable about the pivotal axis 44. A plurality of slots 38 are formed in an undersurface of the cap 42 and aligned with the corresponding grooves 36 in a front-to-back direction, respectively. A pair of deflectable latches 46 are formed on two opposite lateral sides of the cap 42 for locking into the corresponding locking openings 13 in the housing 12. A pair of locking holes 48 are formed within two opposite lateral sides for engagement with the locking pegs 40 of the base block 32. A metallic plate 52 is attached to a rear end face of the cap 42 with a pair of kicker springs 54 thereon.

An optical ribbon 56 includes a plurality of multimode optical fibers 58 side by side arranged with one another therein. Each of the optical fibers 58 includes an inner core 57 and an outer coating 59 which may include a multilayer of cladding, buffer and jacket, wherein the inner core 57 is delicately received within the through hole 34 while the exposed outer coating 59 is received within the corresponding groove 36 and the corresponding slot 38 successively. In this embodiment the base block 32 includes a recessed region 33 to receive therein a lens module 35 which is embedded therein via an insert molding process and functions as a beam expander so as to avoid the strict accurate/intimate alignment between the coupled fibers of the plug connector and the receptacle connector. Understandably, a front tip of the inner core 57 may not directly touch the corresponding lens unit 37 (with a convex surface thereon) of the lens module 35 but with a tiny gap filled with the optical index match gel so as to assure the efficient optical transmission between the optical fiber 58 and the lens unit 37. It is also noted that the apex of the convex surface of each lens unit 37 does not extend beyond the front surface 31 of the base block 32 but recessed within the recessed region 33 so as to avoid dust contamination due to incautious touching. In this embodiment, an alignment post 80 and an alignment aperture 82 are located by two lateral sides of lens module 35 so as to mate with the corresponding alignment aperture and alignment post of the complementary receptacle connector for obtaining the accurate coupling. Understandably, this one alignment post and one alignment aperture arrangement is to share the same corresponding structure around the lens module for both the plug connector and the complementary receptacle connector. Anyhow, either the both two alignment posts or both two alignment apertures may replace this one alignment post and one alignment aperture structure as shown in the second embodiment, if sharing is not a concern.

An electrical assembly 60 is located below the optical fiber assembly 30 in the vertical direction and includes a printed circuit board 62 with a plurality of terminals 64 connected to a front region and a plurality of wires 66 connected to the rear region. A retaining clip 70 is adapted to be inserted into a corresponding slot 68 in the housing 12 along the vertical direction. The wire 66 is connected to the printed circuit board 62 via the corresponding blade 69 with a lance structure piercing into the wire 66 and a compressing/compliance end extending into the a corresponding through hole in the printed circuit board. In this embodiment, the plug connector 10 is further optionally equipped with a anti-dust cover 90 having a cubic piece which is similar to the complementary receptacle connector with a receiving cavity 94 forwardly open to an exterior and compliant with the contour of the plug connector. Similar to the complementary receptacle connector, the anti-dust cover 90 includes a locking surface 92 to abut against a corresponding latching surface 19 of the latch 18 of the plug connector 10 so as to attach the anti-dust cover 90 upon the plug connector 10 for protecting the lens module 35 which is exposed forwardly to an exterior. Anyhow, different from the complementary receptacle connector, the anti-dust cover 90 is not equipped any contacts and the five other surface except the front surface is fully sealed without openings for extension of the contacts or any mounting posts extending therefrom away from the receiving cavity 94.

During assembling, the electrical assembly 60 is forwardly inserted into the receiving cavity 15 from a rear side of the housing 12 to have the corresponding terminals 64 exposed in the electrical mating port 16, and the optical fiber assembly 30 is forwardly inserted into the receiving cavity 15 from the rear side of the housing 12 to have the front end of the base block 32 slightly protruding out of the front face of the housing 12 so as to have the lens module 35 forwardly communicable with an exterior in the front-to-back direction. At the same time, the deflectable latches 46 are locked within the corresponding locking opening 13 to prevent backward movement of the optical fiber assembly 30 in the receiving cavity 15. On the other hand, the kicker spring 54 rearwardly abuts against the retainer clip 70 so as to urge the whole optical fiber assembly 30 forwardly. Understandably, the base block 32 and the associated cap 42 are adapted to be back and forth slightly moveable along the front-to-back direction due to the kicker spring 54, thus resulting in buffering thereof. Therefore, the optical fiber assembly 30 is allowed to be slightly back and forth moveable along the front-to-back direction in the housing 12 during coupling to the corresponding complementary connector.

Figure 12:
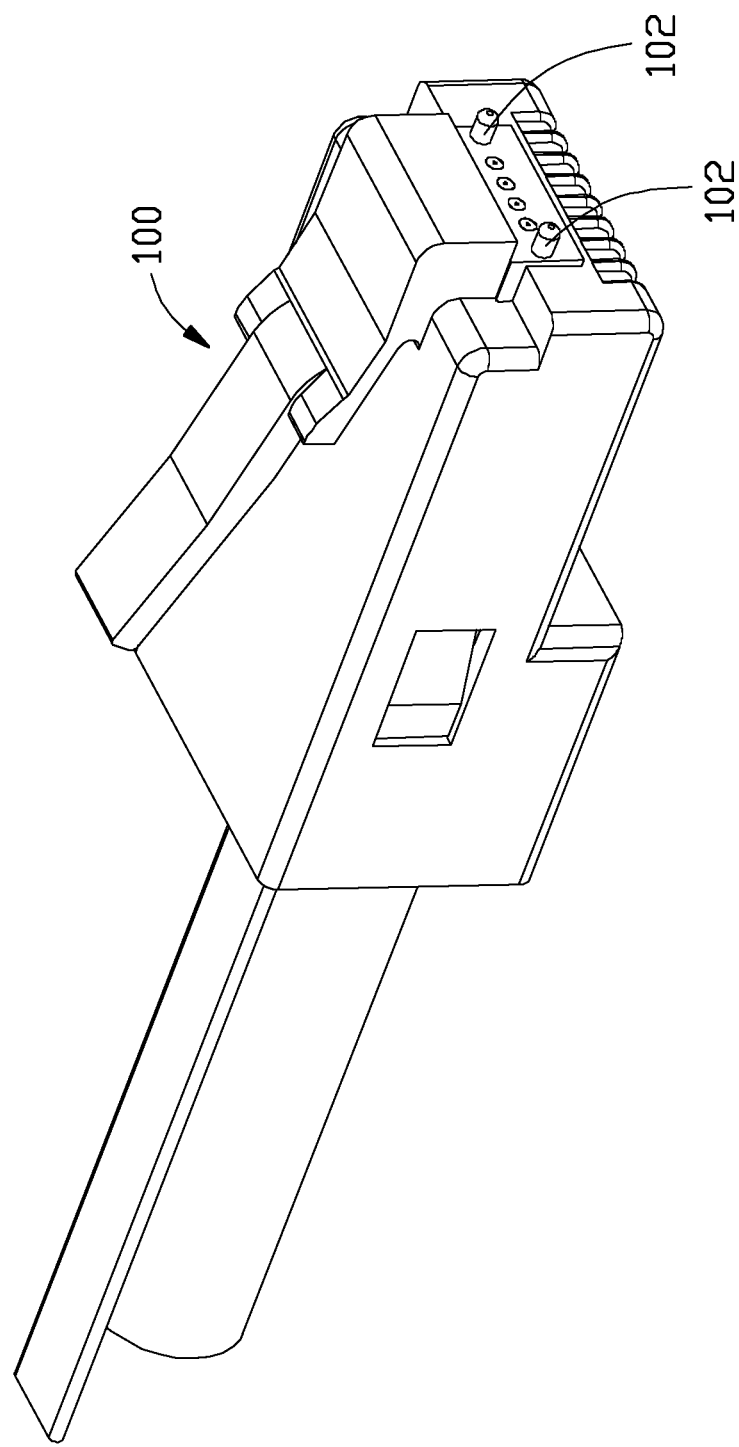
FIG. 12 is a front perspective view of the plug connector according to a second embodiment of the invention.
Figure 13:
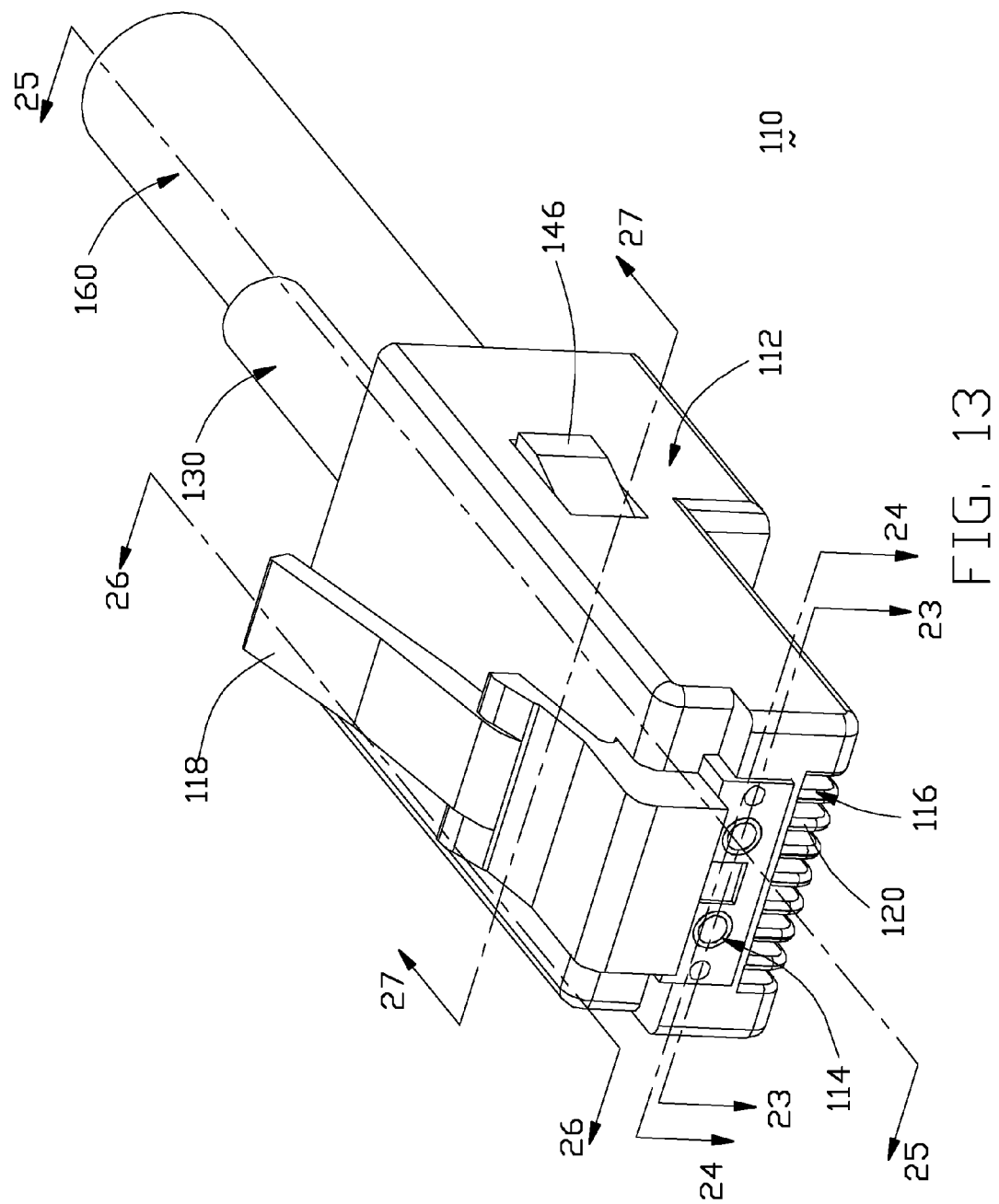
FIG. 13 is a front perspective view of the plug connector according to a third embodiment of the invention.
Figure 14:
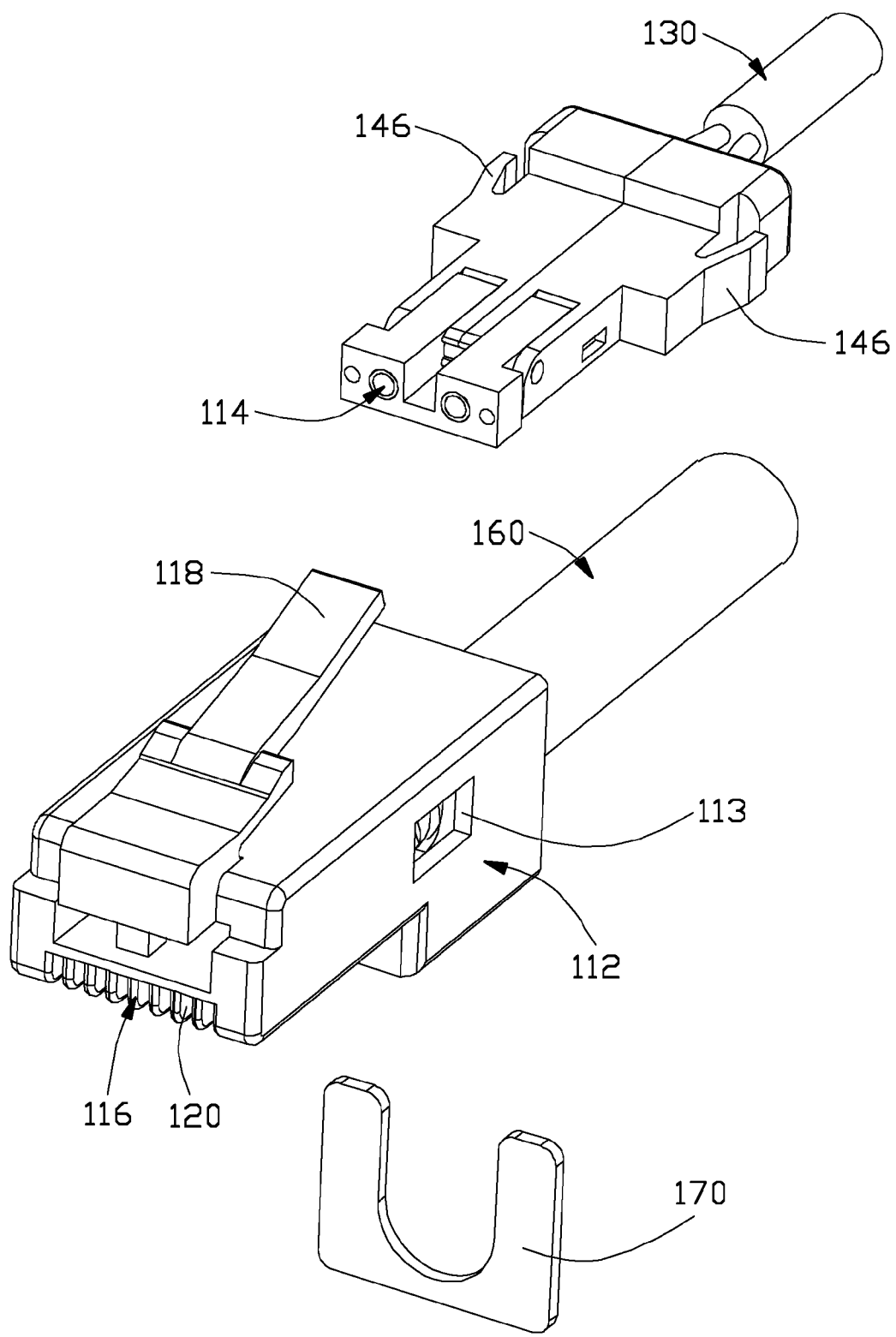
FIG. 14 is a front exploded front perspective view of the plug connector of FIG. 13.
Figure 15:
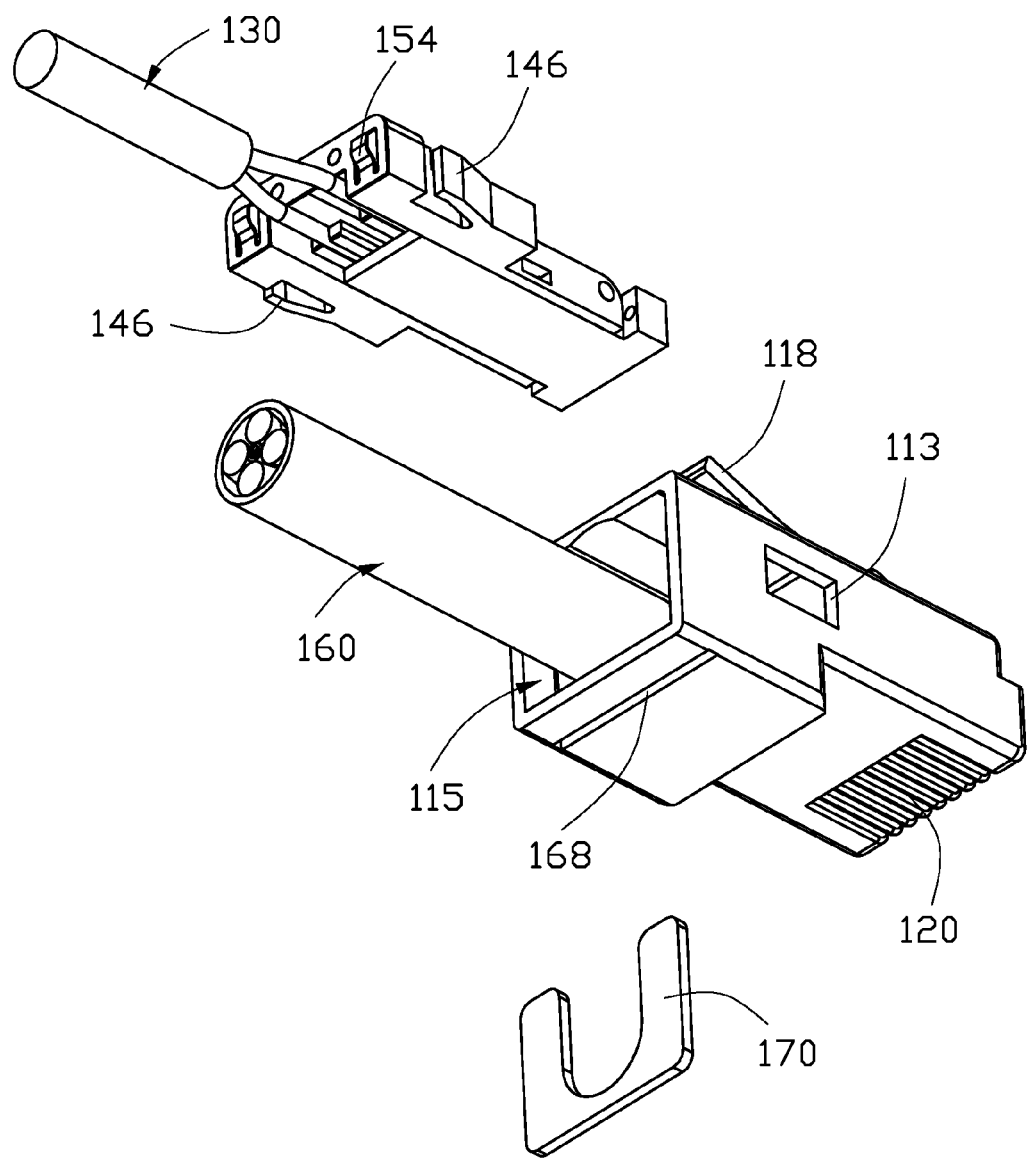
FIG. 15 is a rear exploded perspective view of the plug connector of FIG. 13.
Figure 16:
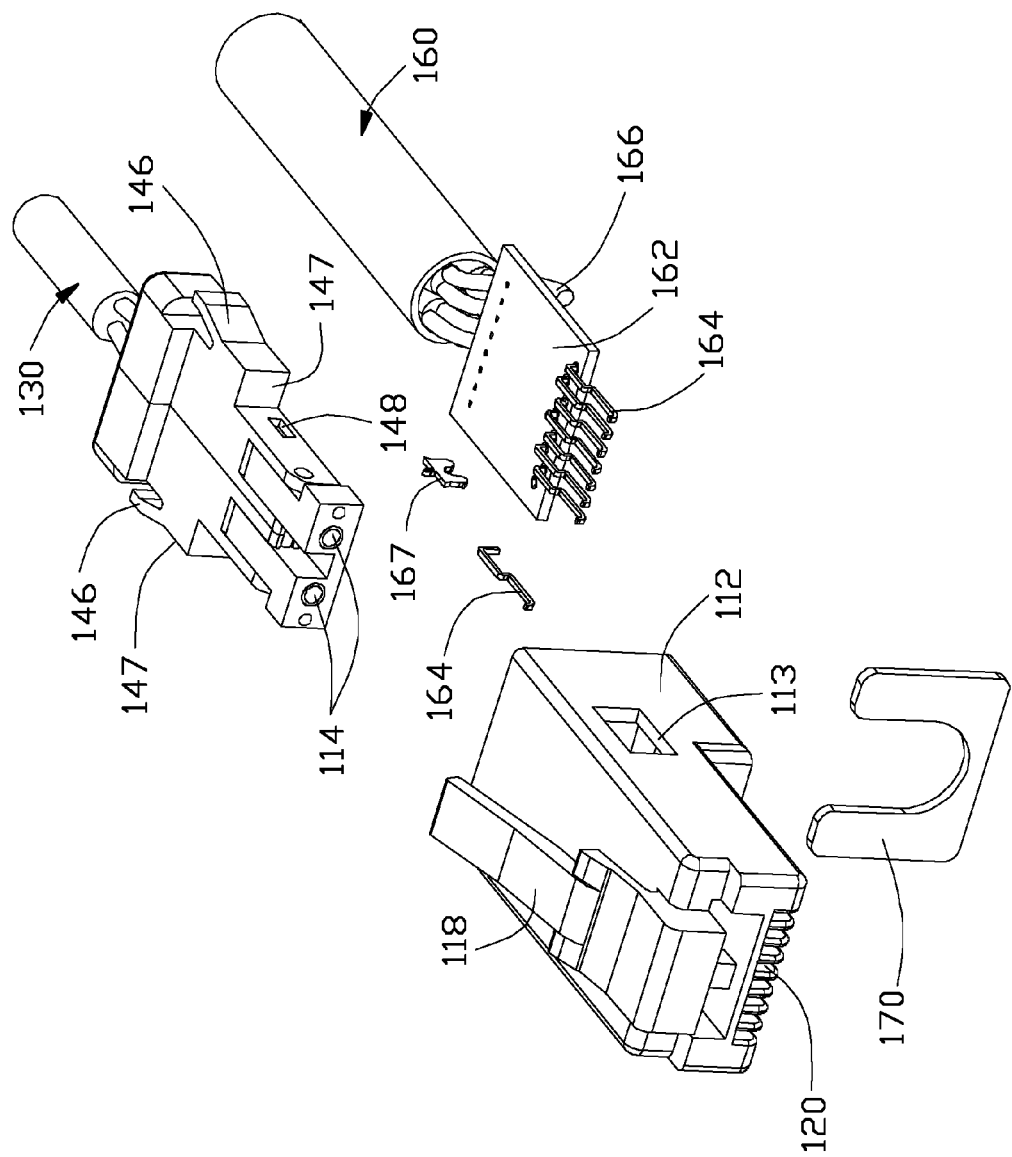
FIG. 16 is a further front exploded perspective view of the plug connector of FIG. 14.
Figure 17:
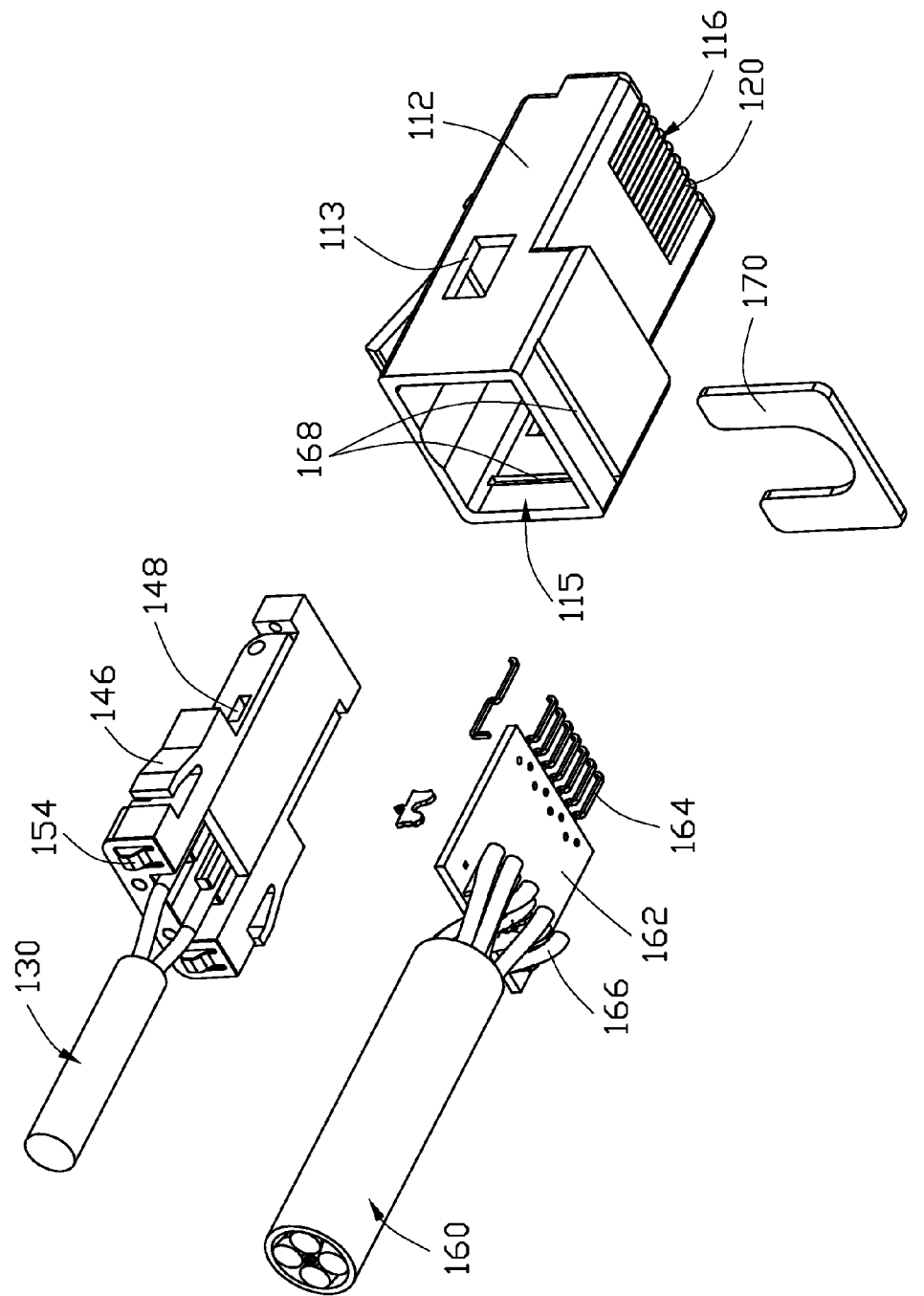
FIG. 17 is a rear exploded perspective view of the plug connector of FIG. 15.
Figure 18:
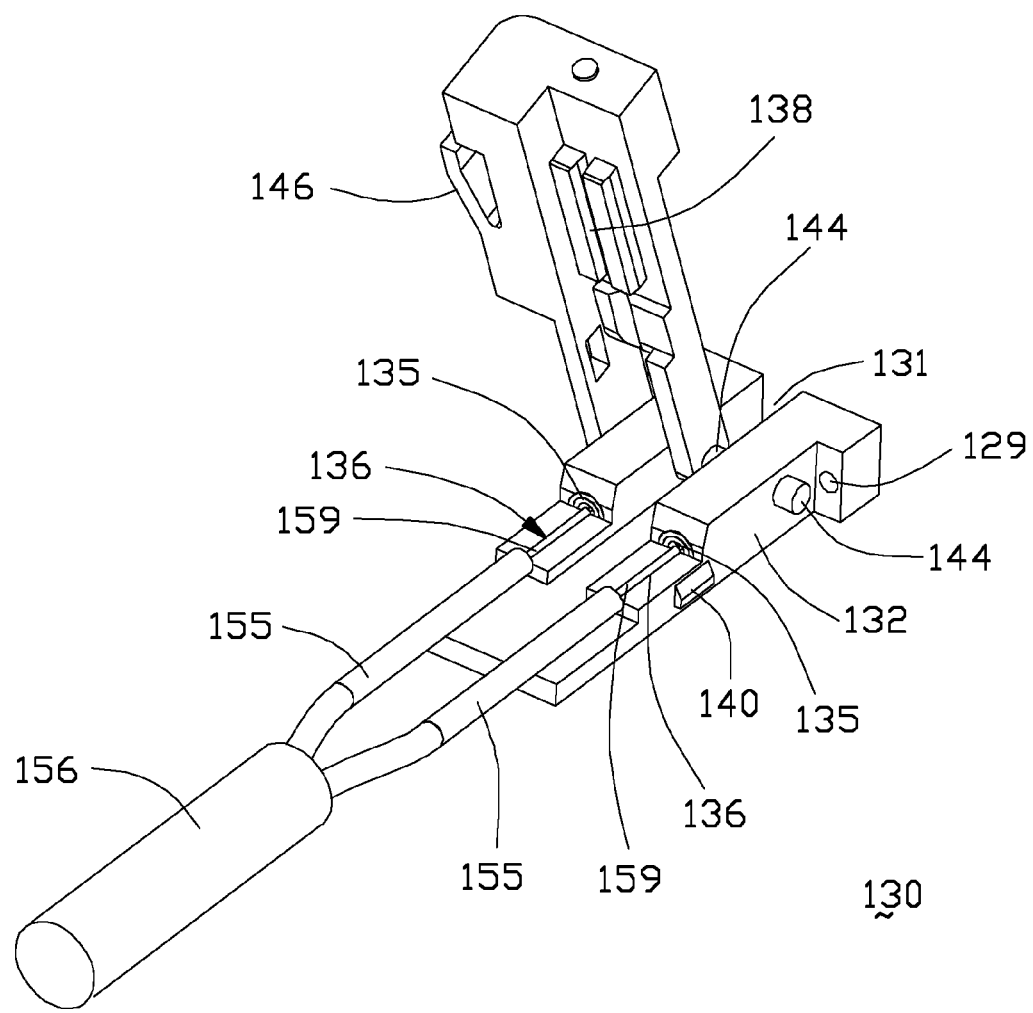
FIG. 18 is a rear perspective view of the optical fiber assembly of the plug connector of FIG. 13 with the cap is rotated to an open position.
Figure 19:
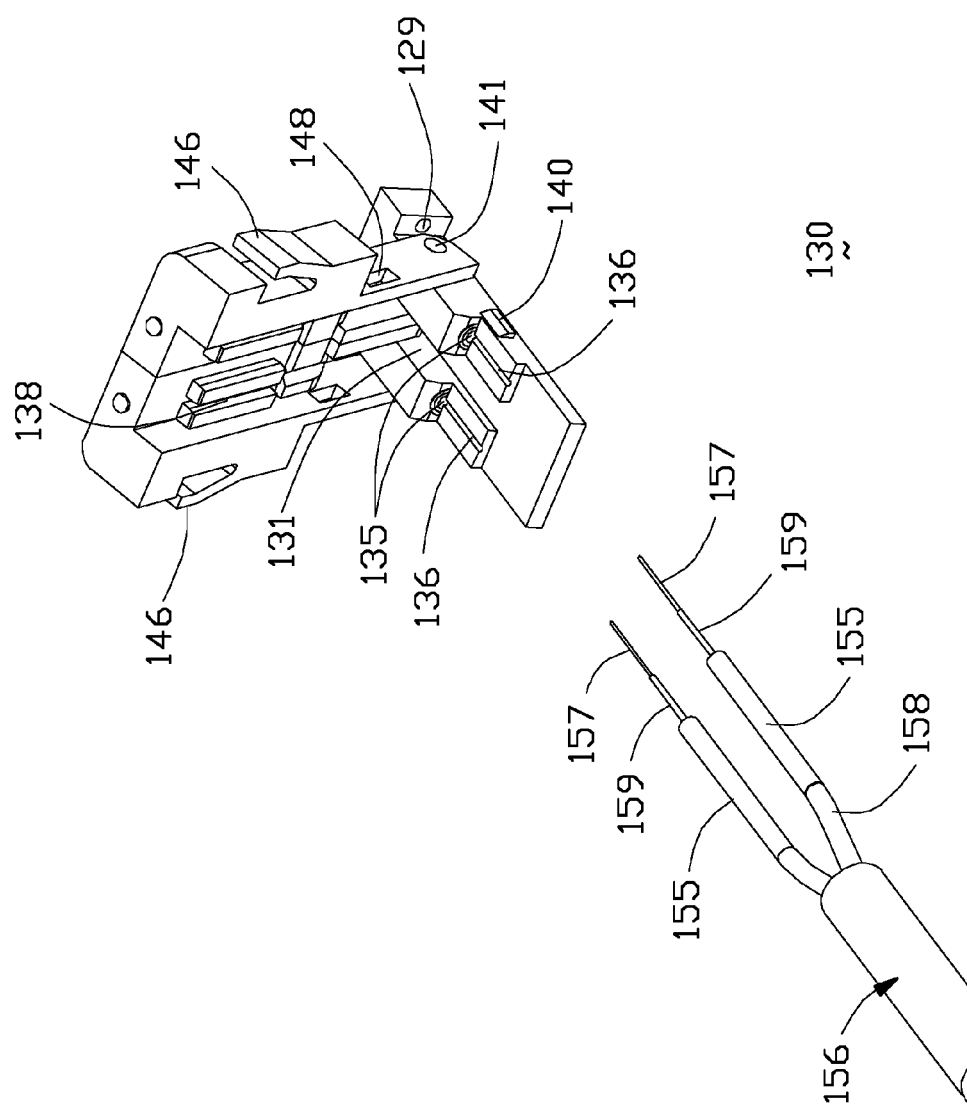
FIG. 19 is a rear exploded perspective view of the optical fiber assembly of FIG. 18.
Figure 20:
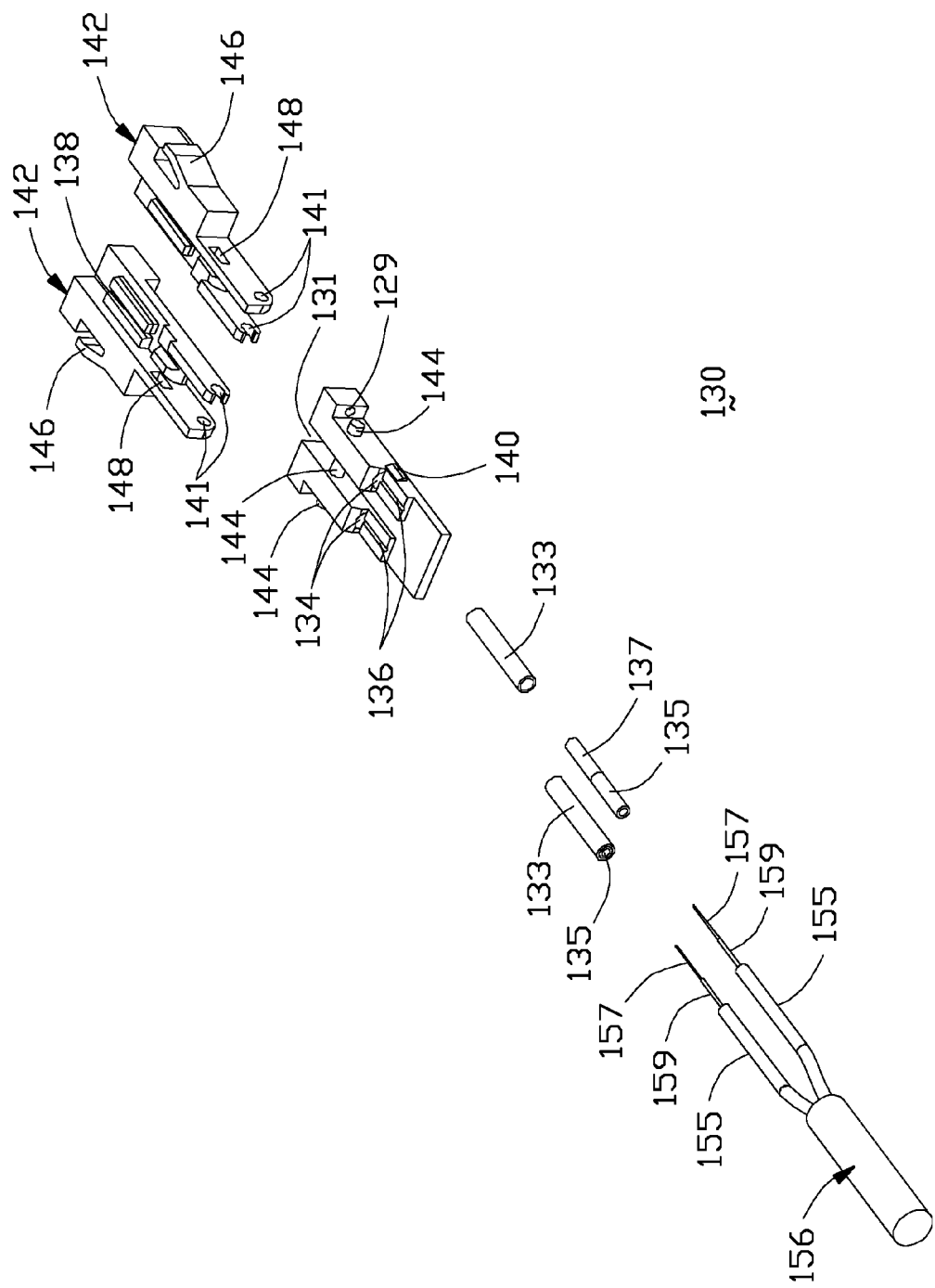
FIG. 20 is a further rear exploded perspective view of the optical fiber assembly of FIG. 18.
Figure 21:
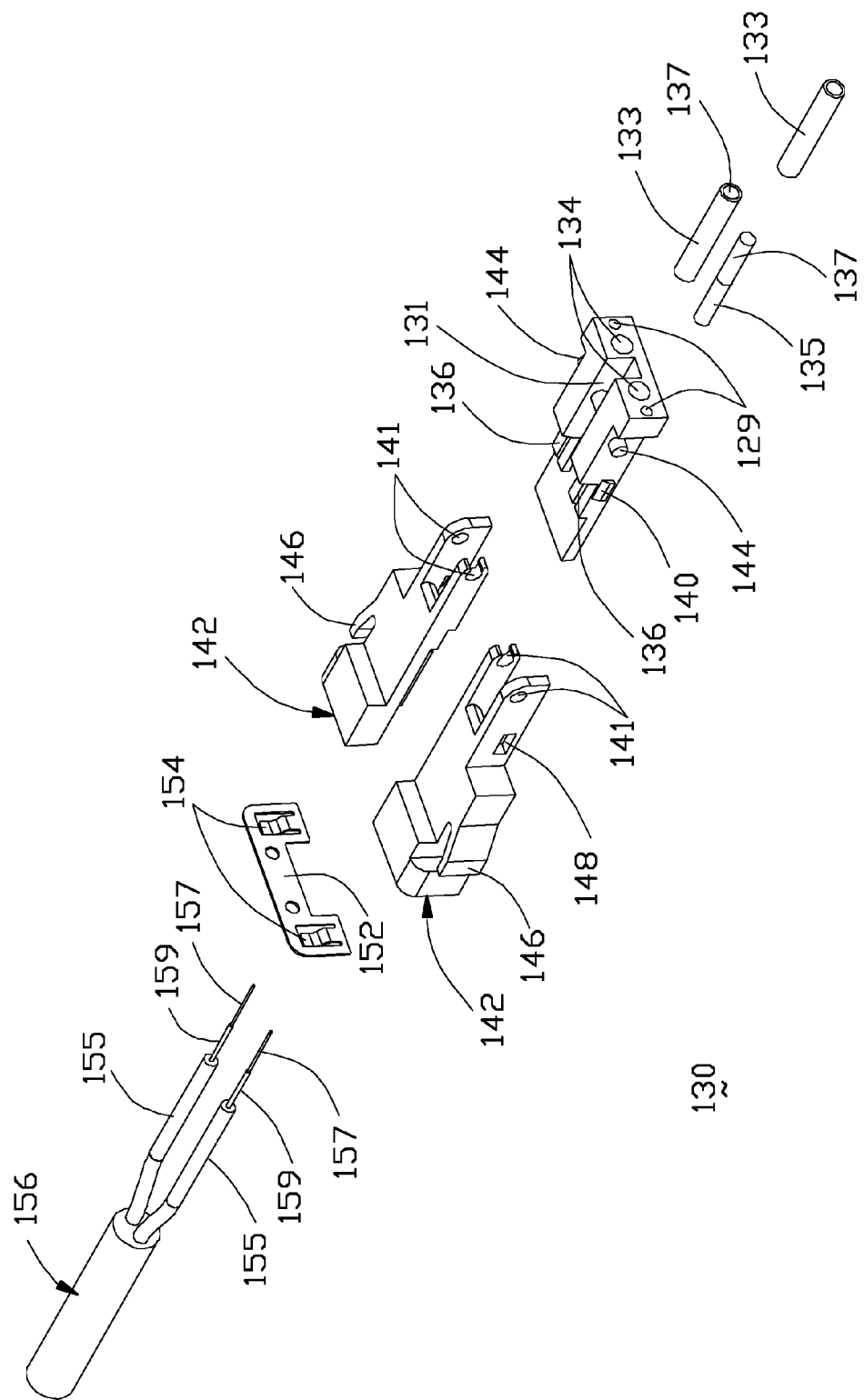
FIG. 21 is further front exploded perspective view of the optical fiber assembly of FIG. 18.
Figure 22:
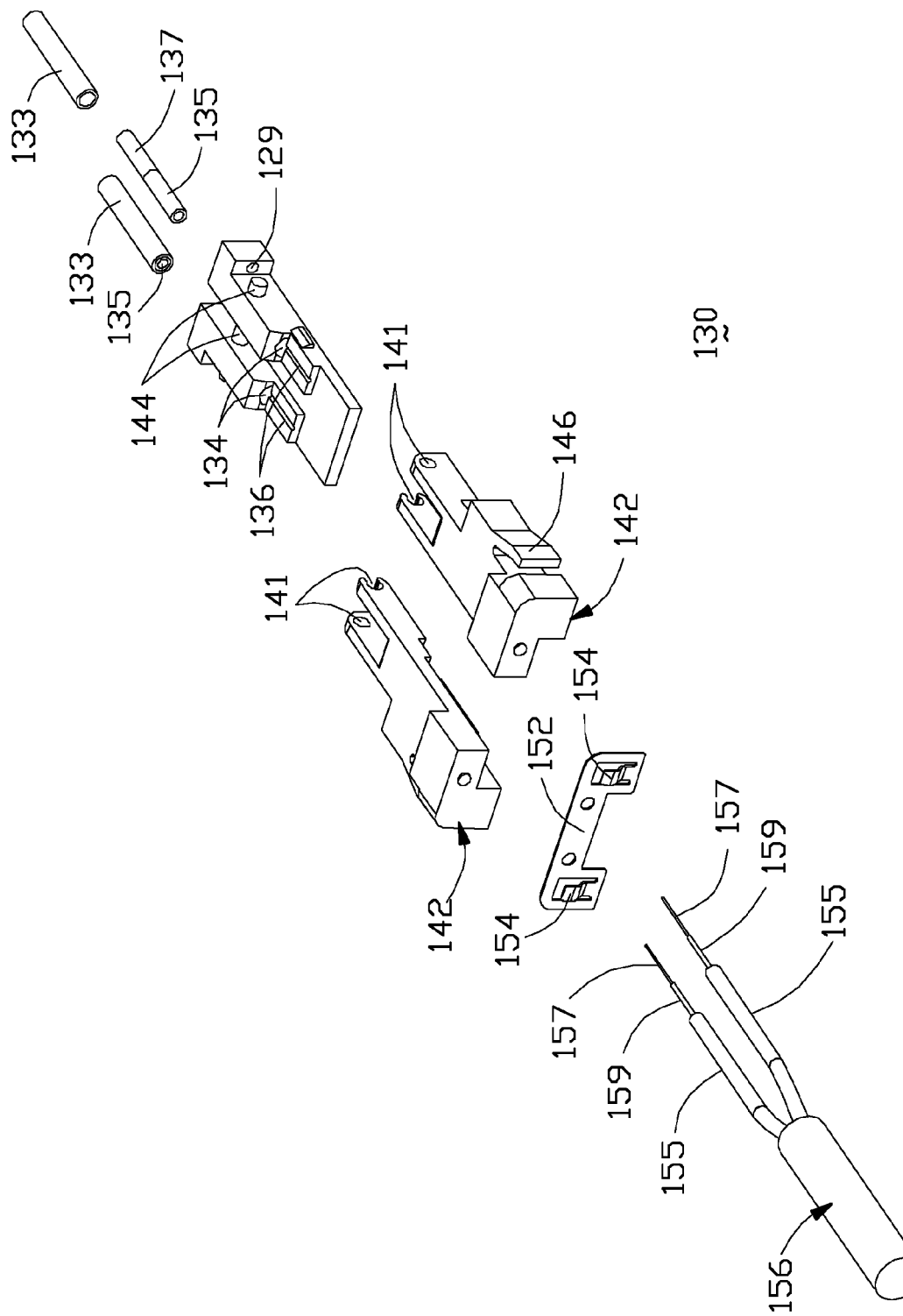
FIG. 22 is a rear exploded perspective view of the optical fiber assembly of FIG. 21.
Figure 23:
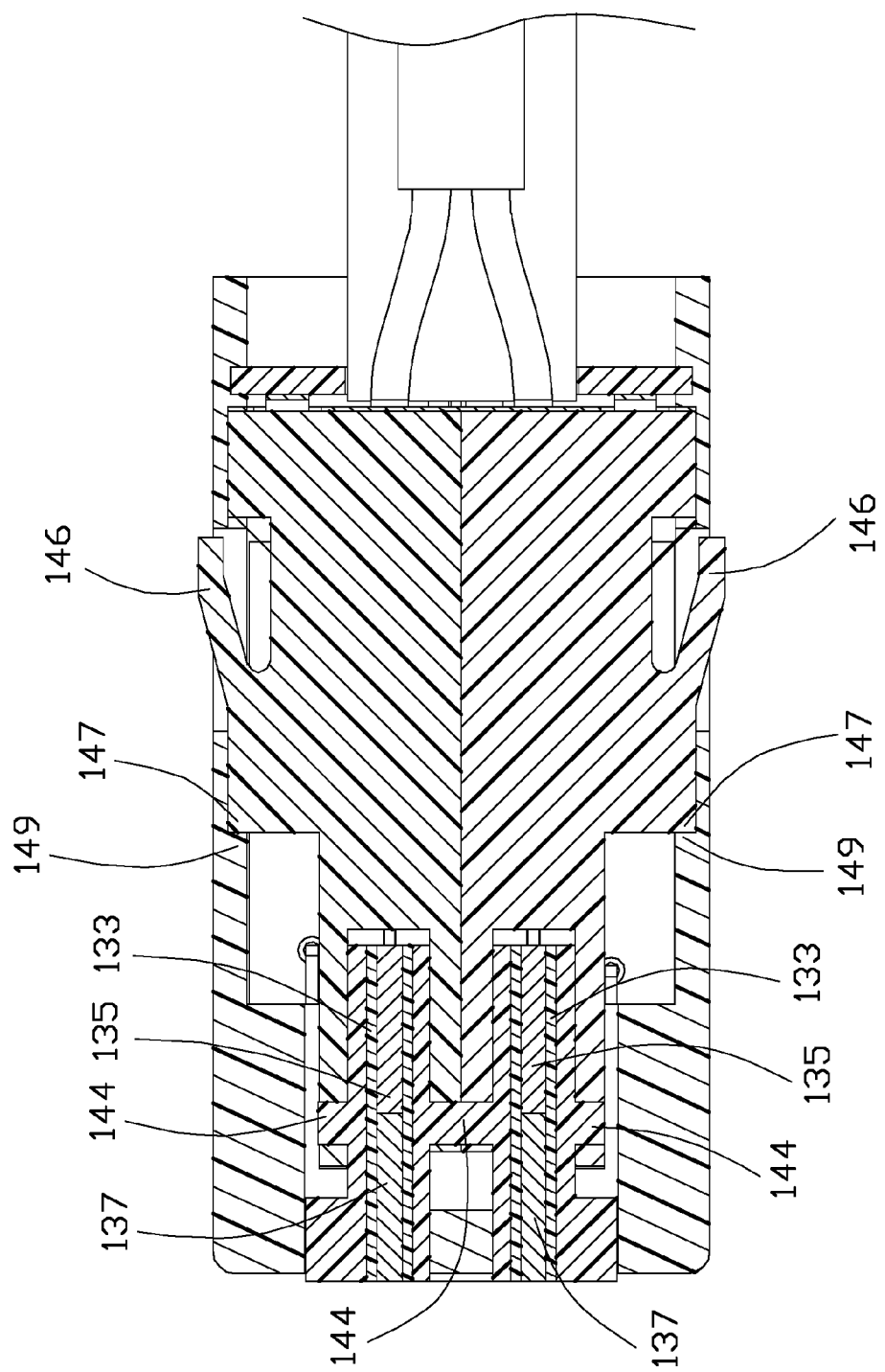
FIG. 23 is a horizontal cross-sectional view of the plug connector of FIG. 13 along line 23-23.
Figure 24:
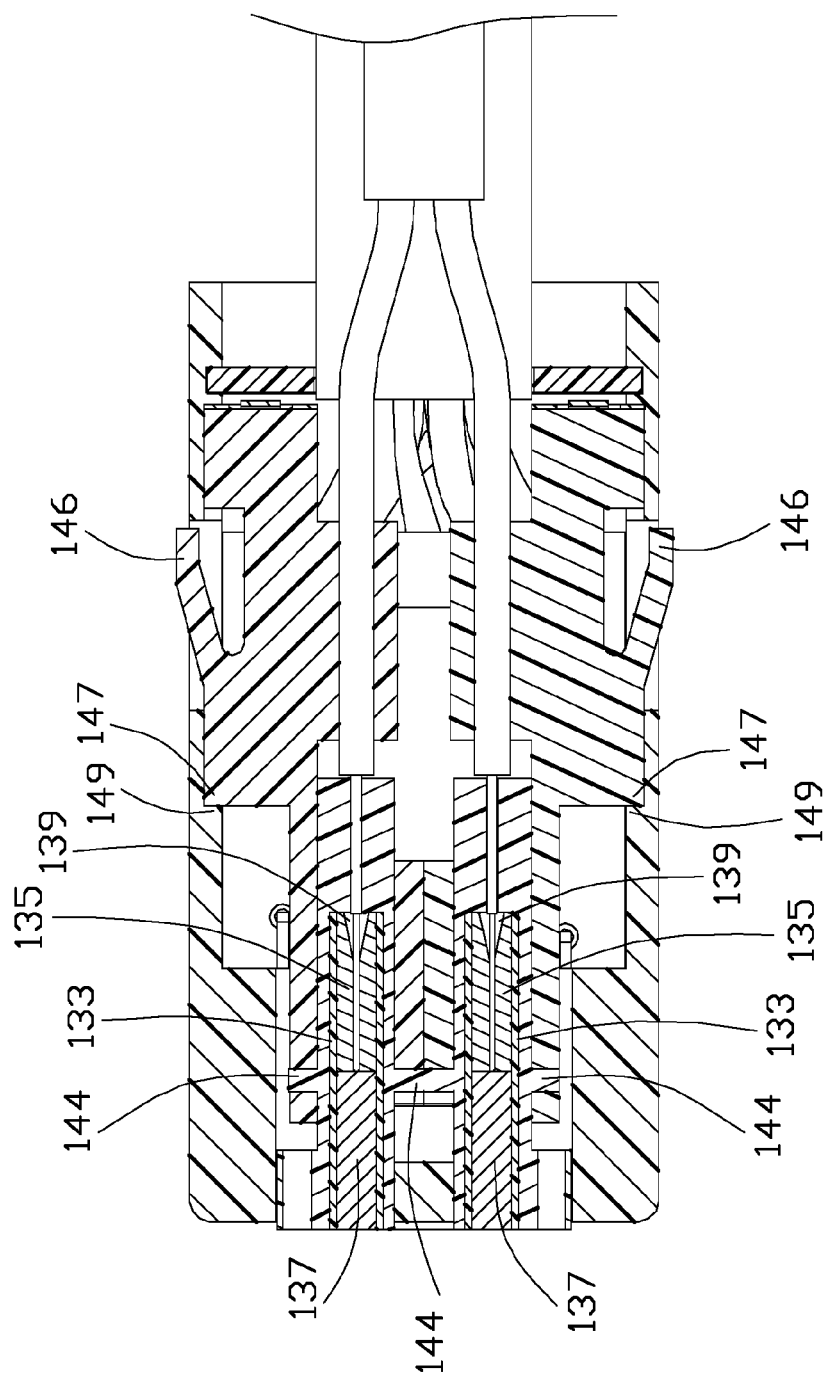
FIG. 24 is another horizontal cross-sectional view of the plug connector of FIG. 13 along line 24-24.
Figure 25:
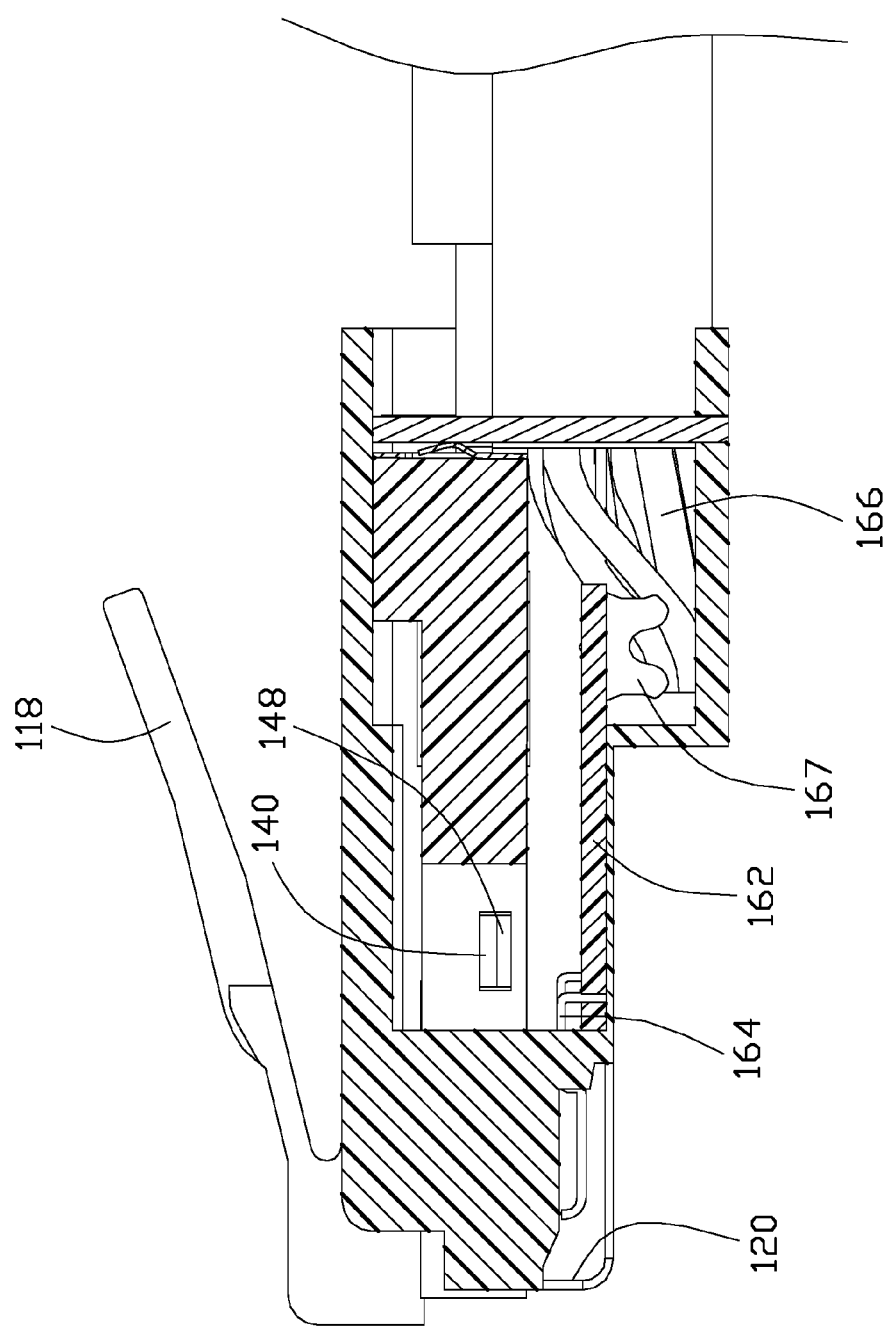
FIG. 25 is a vertical cross-sectional view of the plug connector of FIG. 13 along line 25-25.
Figure 26:
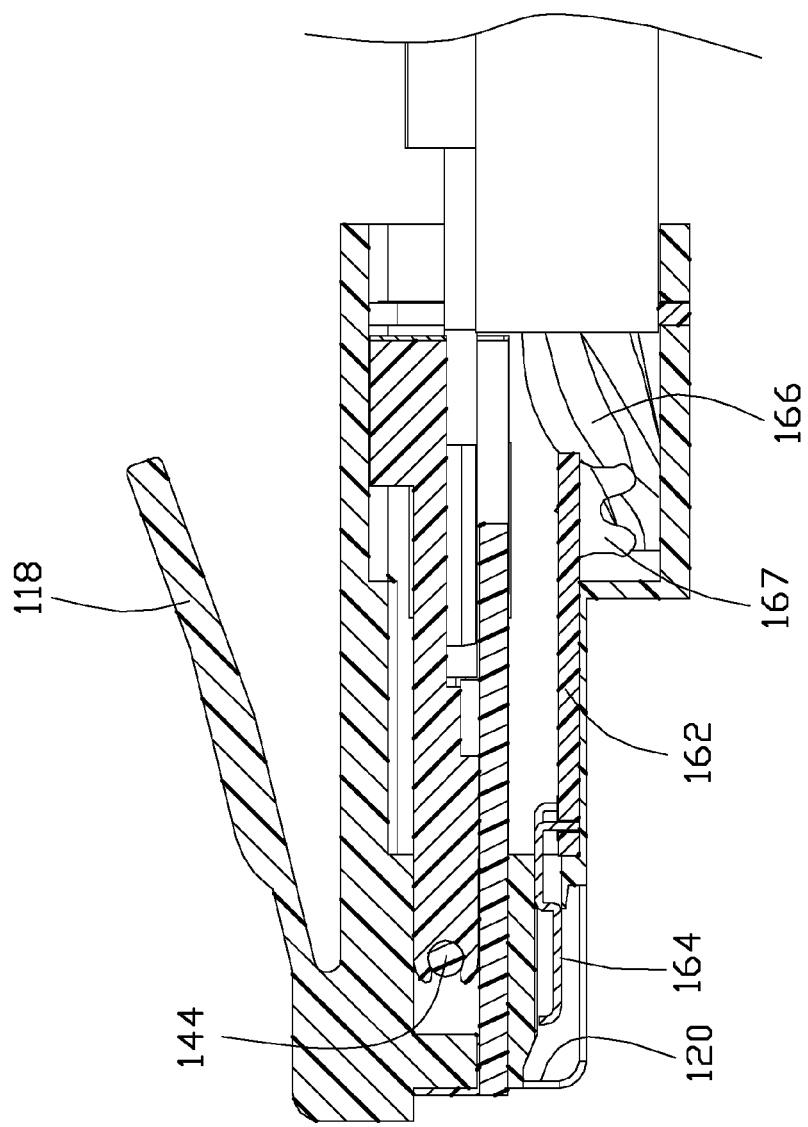
FIG. 26 is another cross-sectional view of the plug connector of FIG. 13 along line 26-26.
Figure 27:
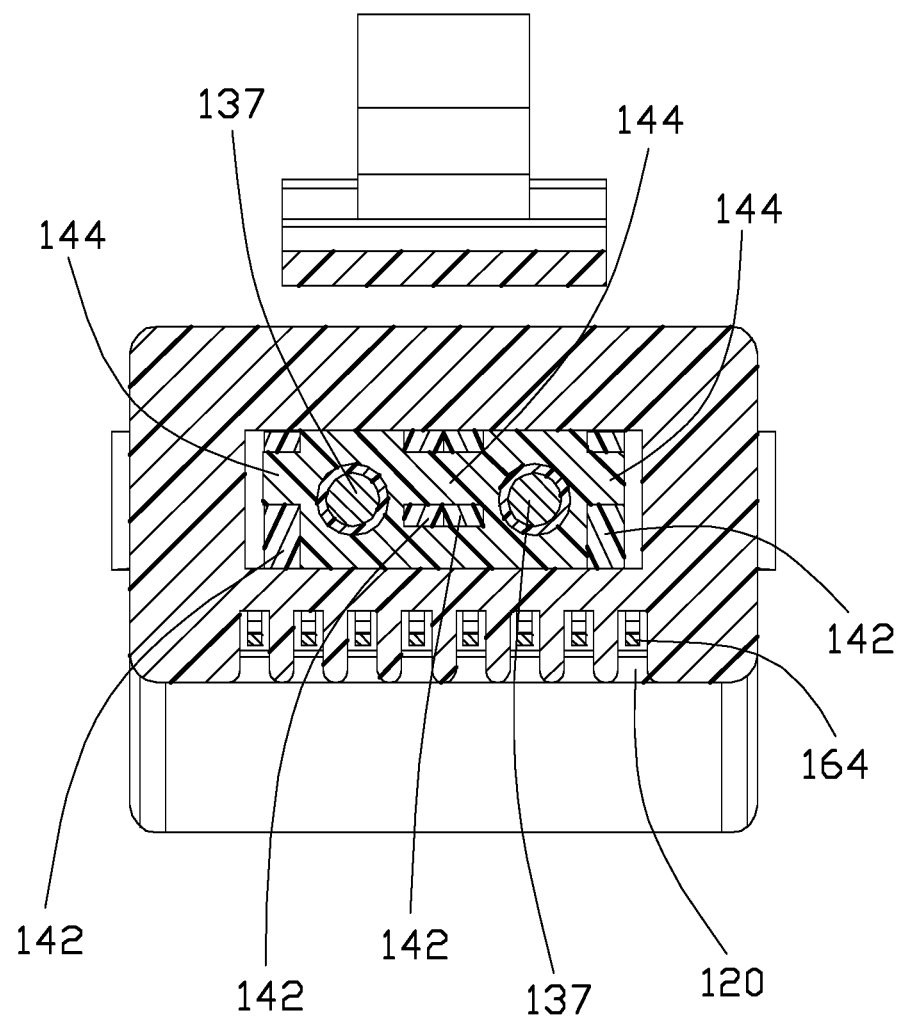
FIG. 27 is another cross-sectional view of the plug connector of FIG. 13 along line 27-27.

Referring to FIG. 12, the plug connector 100 of the second embodiment includes the similar structures with the first embodiment. The plug connector 100 is provided two alignment posts 102 at the two lateral sides of the corresponding optical fibers, respectively.

FIGS. 13-27 show a plug connector 110 of the third embodiment for mating with a receptacle connector. The plug connector 110 includes an insulative housing 112 forming an optical mating port 114 and an electrical mating port 116 stacked with each other in a vertical direction. A receiving cavity 115 is formed in the housing 112 and communicates with the optical mating port 114 and the electrical mating port 116. A resilient latch 118 is unitarily formed on the housing 112 beside the optical mating port 114 and opposite to the electrical mating port 116 in the vertical direction. A plurality of passageways 120 extending along a front-to-back direction, are formed in the housing 112 around the electrical mating port 116. The contour of the housing 112 is compliant with the RJ-45 receptacle connector.

An optical fiber assembly 130 includes a base block 132 forming a pair of parts spaced from each other with a channel 131 therebetween and respectively equipped with a pair of through holes 134 extending along the front-to-back direction therein and a plurality of grooves 136 dimensioned diametrically smaller than the through holes 134 and located behind and communicatively aligned with the corresponding through holes 134 in the front-to-back direction. A pair of locking pegs 140 are formed on two opposite lateral sides of the base block 132. A pair of pivots 144 are formed on two opposite lateral sides of the base block 132 in front of the pair of locking pegs 140, and an additional pivot 144 is formed within the channel 131, wherein all three pivots 144 are aligned together along a transverse direction. A pair of ceramic/glass mating sleeves 133 is snugly received/retained within the corresponding pair of through holes 134, respectively. A front GRIN lens 137 and a rear guide-in glass cylinder 135 are commonly received within each of the mating sleeves 133 and aligned with each other along the front-to-back direction, wherein the rear guide-in glass cylinder 135 forms a passage 139 to receive an inner core of the optical fiber (illustrated later). Understandably, the interface between the GRIN lens 137 and the guide-in glass cylinder 135 may extend at an angle of eight degrees. A pair of holes 129 are formed in a front face of the base block 132 for receiving a corresponding pair of alignment posts of the mated receptacle connector (not shown).

A pair of caps 142 are pivotally mounted to the base block 132 and rotatable about the corresponding pivots 144 with the corresponding apertures 141 receiving the pivots 144, respectively. In each cap 142, a slot 138 is formed in an undersurface of the cap 142 and aligned with the corresponding grooves 36 in a front-to-back direction, respectively. A pair of deflectable latches 146 are respectively formed on the outer lateral sides of the corresponding caps 142 for locking into the corresponding locking openings 113 in the housing 112. A pair of locking holes 148 are formed within the outer lateral sides of the corresponding caps 142 for engagement with the locking pegs 140 of the base block 132. A metallic plate 152 is attached to a rear end face of the pair of caps 142 with a pair of kicker springs 154 thereon. Notably, the metallic plate 152 can be made by two pieces each attached to the corresponding cap 142.

An optical ribbon 156 includes a pair of single mode optical fibers 158 side by side arranged with each other therein. Each of the optical fibers 158 includes an inner core 157 enclosed within an outer buffer 159 which further is enclosed within an outer jacket 155 wherein the inner core 157 is delicately received within the corresponding guide-in passage 139 with the front tip intimately confronting the corresponding GRIN lens 137, the outer buffer 159 is received within the corresponding groove 136, and the outer jacket 155 is received within the corresponding slot 138.

An electrical assembly 160 is located below the optical fiber assembly 130 in the vertical direction and includes a printed circuit board 162 with a plurality of terminals 164 connected to a front region and a plurality of wires 166 connected to the corresponding blade or IDCs 167 (Insulation Displacement Contact) on the rear region. A retaining clip 170 is adapted to be inserted into a corresponding slot 168 in the housing 112 along the vertical direction.

During assembling, the electrical assembly 160 is forwardly inserted into the receiving cavity 115 from a rear side of the housing 112 to have the corresponding terminals 164 exposed in the electrical mating port 116, and the optical fiber assembly 130 is forwardly inserted into the receiving cavity 115 from the rear side of the housing 112 to have the front end of the base block 132 slightly protruding out of the front face of the housing 112 so as to have the GRIN lens 137 forwardly communicable with an exterior in the front-to-back direction. At the same time, the deflectable latches 146 are locked within the corresponding locking opening 113 to prevent backward movement of the optical fiber assembly 130 in the receiving cavity 115. On the other hand, the kicker spring 154 rearwardly abuts against the retainer clip 170 so as to urge the whole optical fiber assembly 130 forwardly until the shoulders 147 abut against the stepped structures 149 of the housing 112. Understandably, the base block 132 and the associated cap 142 are adapted to be back and forth slightly moveable along the front-to-back direction due to the kicker spring 154, thus resulting in buffering thereof. Therefore, the optical fiber assembly 130 is allowed to be slightly back and forth moveable along the front-to-back direction in the housing 112 during coupling to the corresponding complementary connector.

What is claimed is:

1. A hybrid plug connector comprising:
   an insulative housing forming a cavity extending through a front face thereof to forwardly communicate with an exterior in a front-to-back direction;
   a plurality of passageways formed in the housing and spaced from the cavity in a vertical direction perpendicular to said front-to-back direction;
   an electrical assembly received within the cavity and including a printed circuit board with a plurality of terminals connected thereon, a contacting section of each of the terminals extending into the corresponding passageway and communicating with the exterior in the vertical direction;
   an optical fiber assembly received within the cavity; and
   a deflectable latch formed upon the housing opposite to the terminals; wherein
   the optical fiber assembly is essentially located at a middle level between the latch and the terminals in the vertical direction; wherein
   a forwardly exposed lens module is disposed around a front surface of said optical fiber assembly with corresponding convex structures to collimate light beams for light transmission in said front-to-back direction.

2. The hybrid plug connector as claimed in claim 1, wherein each of the terminals defines a strip configuration with bents thereof.

3. The hybrid plug connector as claimed in claim 1, wherein said optical fiber assembly is equipped with a buffering device to be slightly back and forth moveable relative to the housing in the front-to-back direction.

4. The hybrid plug connector as claimed in claim 1, wherein the optical fiber assembly includes a plurality of optical fibers and the lens module includes a plurality of lens units with said corresponding convex structures thereon in alignment with the corresponding optical fibers in the front-to-back direction, respectively.

5. The hybrid plug connector as claimed in claim 4, wherein said optical fiber assembly includes a base block and a cap pivotally mounted on the base block, and one of said cap and said base block includes a buffering device to have the optical fiber assembly slightly back and forth moveable relative to the housing in the front-to-back direction.

6. The hybrid plug connector as claimed in claim 5, wherein said front end of the base block slightly protrudes out of the front face of the housing.

7. The hybrid plug connector as claimed in claim 5, wherein said base block includes a recessed region in which said lens module is disposed.

8. The hybrid plug connector as claimed in claim 7, wherein the convex structures are hidden within the recessed region and behind the front surface for anti-dust consideration.

9. The hybrid plug connector as claimed in claim 1, wherein an alignment post extends forwardly from the front surface of the optical fiber assembly and beside the lens module in a transverse direction perpendicular to both said front-to-back direction and said vertical direction.

10. The hybrid plug connector as claimed in claim 1, further comprising an anti-dust cover surrounding the housing with a locking structure secure to the deflectable latch in a releasable manner.

11. A hybrid plug connector comprising:
an insulative housing forming a cavity extending through a front face thereof to forwardly communicate with an exterior in a front-to-back direction;
a plurality of passageways formed in the housing and spaced from the cavity in a vertical direction perpendicular to said front-to-back direction;
an electrical assembly received within the cavity and including a printed circuit board with a plurality of terminals connected thereon, a contacting section of each of the terminals extending into the corresponding passageway and communicating with the exterior in the vertical direction;
an optical fiber assembly received within the cavity; and
a deflectable latch formed upon the housing opposite to the terminals; wherein
the optical fiber assembly is essentially located at a middle level between the latch and the terminals in the vertical direction; wherein
the optical fiber assembly includes a base block and at least one cap pivotally mounted thereon, a pair of through holes formed in the base block, and a pair of mating sleeves disposed in the corresponding through holes, and each mating sleeve receives a front GRIN lens and a rear guide-in cylinder.

12. The hybrid plug connector as claimed in claim 11, wherein said optical fiber assembly is equipped with a buffering device to be slightly back and forth moveable relative to the housing in the front-to-back direction.

13. The hybrid plug connector as claimed in claim 11, wherein the optical fiber assembly includes a plurality of optical fibers inserted into the corresponding guide-in cylinder respectively.

14. The hybrid plug connector as claimed in claim 13, wherein each of the optical fibers includes an inner core which is delicately received within a corresponding guide-in passage of the rear guide-in cylinder with the front tip of each optical fiber intimately confronting the corresponding front GRIN lens.

15. The hybrid plug connector as claimed in claim 11, wherein the base block forms a channel between the pair of through holes along the front-to-back direction, and the cap includes two parts each forming a fork structure to sandwich and pivotally mounted to a corresponding portion of the base block beside the channel.

* * * * *